US012694100B2

(12) United States Patent
George et al.

(10) Patent No.: US 12,694,100 B2
(45) Date of Patent: *Jul. 28, 2026

(54) CREATION AND RETENTION OF IMMUTABLE SNAPSHOTS TO FACILITATE RANSOMWARE PROTECTION

(71) Applicant: NetApp, Inc., San Jose, CA (US)

(72) Inventors: Tijin George, Sunnyvale, CA (US); Vijay Srinath, Bangalore (IN); Ling Zheng, Saratoga, CA (US)

(73) Assignee: NetApp, Inc., San Jose, CA (US)

( * ) Notice: Subject to any disclaimer, the term of this patent is extended or adjusted under 35 U.S.C. 154(b) by 285 days.

This patent is subject to a terminal disclaimer.

(21) Appl. No.: 18/168,741

(22) Filed: Feb. 14, 2023

(65) Prior Publication Data

US 2024/0273186 A1     Aug. 15, 2024

(51) Int. Cl.
| | |
|---|---|
| *H04L 9/00* | (2022.01) |
| *G06F 16/11* | (2019.01) |
| *G06F 16/178* | (2019.01) |
| *G06F 21/55* | (2013.01) |
| *G06F 21/62* | (2013.01) |

(52) U.S. Cl.
CPC .......... *G06F 21/552* (2013.01); *G06F 16/125* (2019.01); *G06F 16/128* (2019.01); *G06F 16/178* (2019.01); *G06F 21/6218* (2013.01); *G06F 2221/034* (2013.01)

(58) Field of Classification Search
CPC .................................................. G06F 21/552
USPC .......................................................... 726/23
See application file for complete search history.

(56) References Cited

U.S. PATENT DOCUMENTS

| | | | | |
|---|---|---|---|---|
| 2013/0145429 | A1* | 6/2013 | Mendel ................... | G06F 21/57 |
| | | | | 726/17 |
| 2018/0173874 | A1* | 6/2018 | Muttik .................... | G06F 21/57 |
| 2019/0005261 | A1* | 1/2019 | Volvovski ........... | G06F 21/6218 |
| 2020/0007620 | A1 | 1/2020 | Das et al. | |
| 2022/0100378 | A1* | 3/2022 | Borate .................. | G06F 21/568 |

(Continued)

OTHER PUBLICATIONS

Non-Final Office Action mailed on Dec. 13, 2024 for U.S. Appl. No. 18/168,739, filed Feb. 14, 2020, 14 pages.

(Continued)

*Primary Examiner* — Christopher J Brown
(74) *Attorney, Agent, or Firm* — Jaffery Watson Hamilton & DeSanctis LLP

(57) ABSTRACT

Systems and methods for creation and retention of immutable snapshots to facilitate ransomware protection are provided. According to one embodiment, multiple use cases for retention of snapshots are supported, including (i) maintaining a locked snapshot on a source volume of a first storage system on which it was originally created for at least an associated immutable retention time; (ii) replicating the locked snapshot to a destination volume of a second storage system and also maintaining the replica of the locked snapshot on the destination volume for at least the associated immutable retention time; and (iii) maintaining an unlocked snapshot on the source volume, replicating the unlocked snapshot to the destination volume, locking the replicated snapshot on the destination volume when it has an associated non-zero immutable retention time, and thereafter maintaining the replica on the destination volume in accordance with the immutable retention time.

26 Claims, 14 Drawing Sheets

(56)                References Cited

U.S. PATENT DOCUMENTS

| 2022/0121620 | A1 |   | 4/2022 | Rath et al. |
| 2023/0103474 | A1 | * | 4/2023 | Gunda ................. G06F 11/1448 |
|  |  |  |  | 711/162 |
| 2024/0275814 | A1 |   | 8/2024 | George et al. |

OTHER PUBLICATIONS

Non-Final Office Action mailed on Mar. 28, 2025 for U.S. Appl. No. 18/168,739, filed Feb. 14, 2023, 16 pages.

* cited by examiner

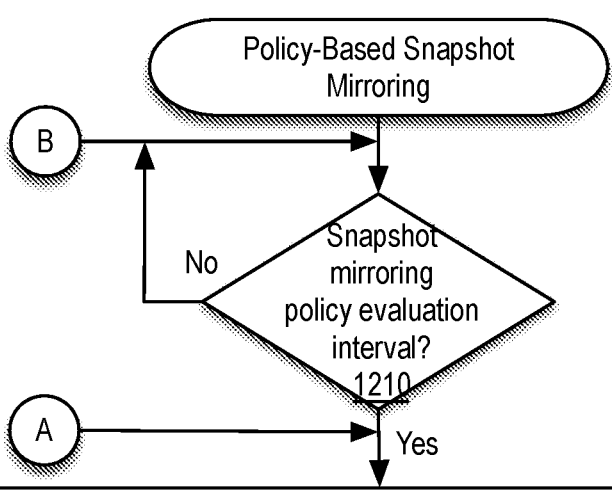

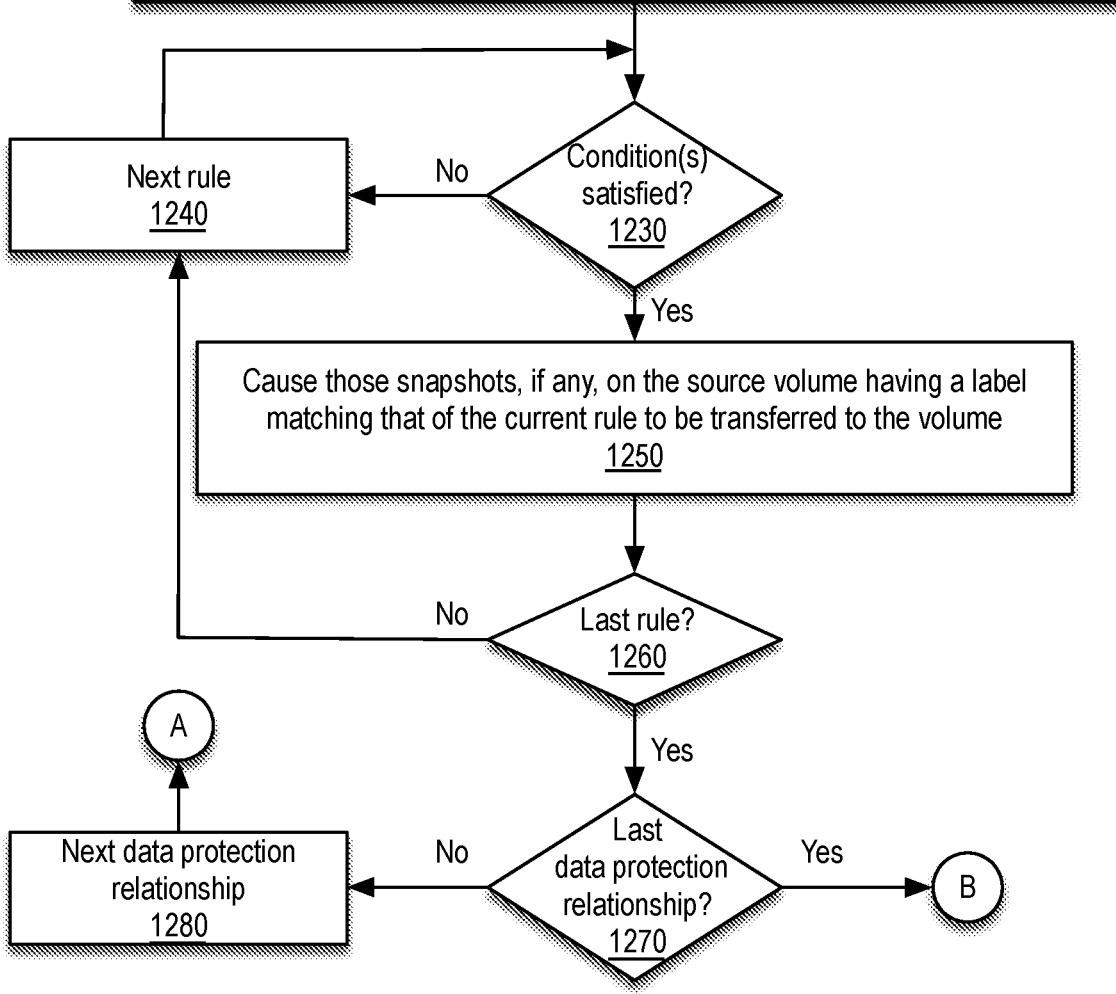

Policy-Based Snapshot Mirroring

B

Snapshot mirroring policy evaluation interval? 1210

No

A → Yes

Evaluate condition(s) of a current (first/next) rule of a snapshot mirroring policy associated with a current data protection relationship between the volume (the destination volume) and a source volume of the current data protection relationship 1220

Next rule 1240 ← No — Condition(s) satisfied? 1230

Yes

Cause those snapshots, if any, on the source volume having a label matching that of the current rule to be transferred to the volume 1250

No ← Last rule? 1260

Yes

A

Next data protection relationship 1280 ← No — Last data protection relationship? 1270 — Yes → B

*FIG. 12*

CREATION AND RETENTION OF IMMUTABLE SNAPSHOTS TO FACILITATE RANSOMWARE PROTECTION

BACKGROUND

Field

Various embodiments of the present disclosure generally relate to techniques for combating ransomware. In particular, some embodiments relate to an approach for creating and retaining an immutable snapshot until an associated retention time tag has expired to facilitate recovery from a ransomware attack.

Description of the Related Art

Existing techniques for combating ransomware include isolated recovery environments that utilize immutable data vaults. An isolated recovery environment is a dedicated and secure computing context that is equipped with various resources and/or tools for verifying and/or recovering private data from immutable backup copies. An immutable data vault is an air-gapped and unchangeable independent backup copy of private data. Such existing techniques will periodically create immutable data vaults (e.g., unchangeable copies of private data) and, once ransomware corruption is detected or otherwise revealed, will transfer such immutable data vaults to an isolated recovery environment so that the most recent uncorrupted immutable data vault can be identified. To detect and/or remedy ransomware corruption, such existing techniques analyze file operations across immutable data vaults, data change rates across immutable data vaults, and/or encryption entropy across immutable data vaults.

SUMMARY

Systems and methods are described for creation and retention of immutable snapshots to facilitate ransomware protection. According to one embodiment, a replica of a snapshot of a source volume of a first storage system is received by a second storage system. The replica is to be retained in locked form on a destination volume of the second storage system and the snapshot is stored in unlocked form on the source volume. The replica is locked on the destination volume by assigning an immutable retention time to the replica based on a retention time associated with the snapshot. Thereafter, deletion of the locked replica is precluded by the second storage system until a tamper-proof timer meets or exceeds the immutable retention time.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 12 is a flow diagram illustrating a set of operations for policy-based snapshot mirroring in accordance with an embodiment of the present disclosure.

DETAILED DESCRIPTION

Figure 1:
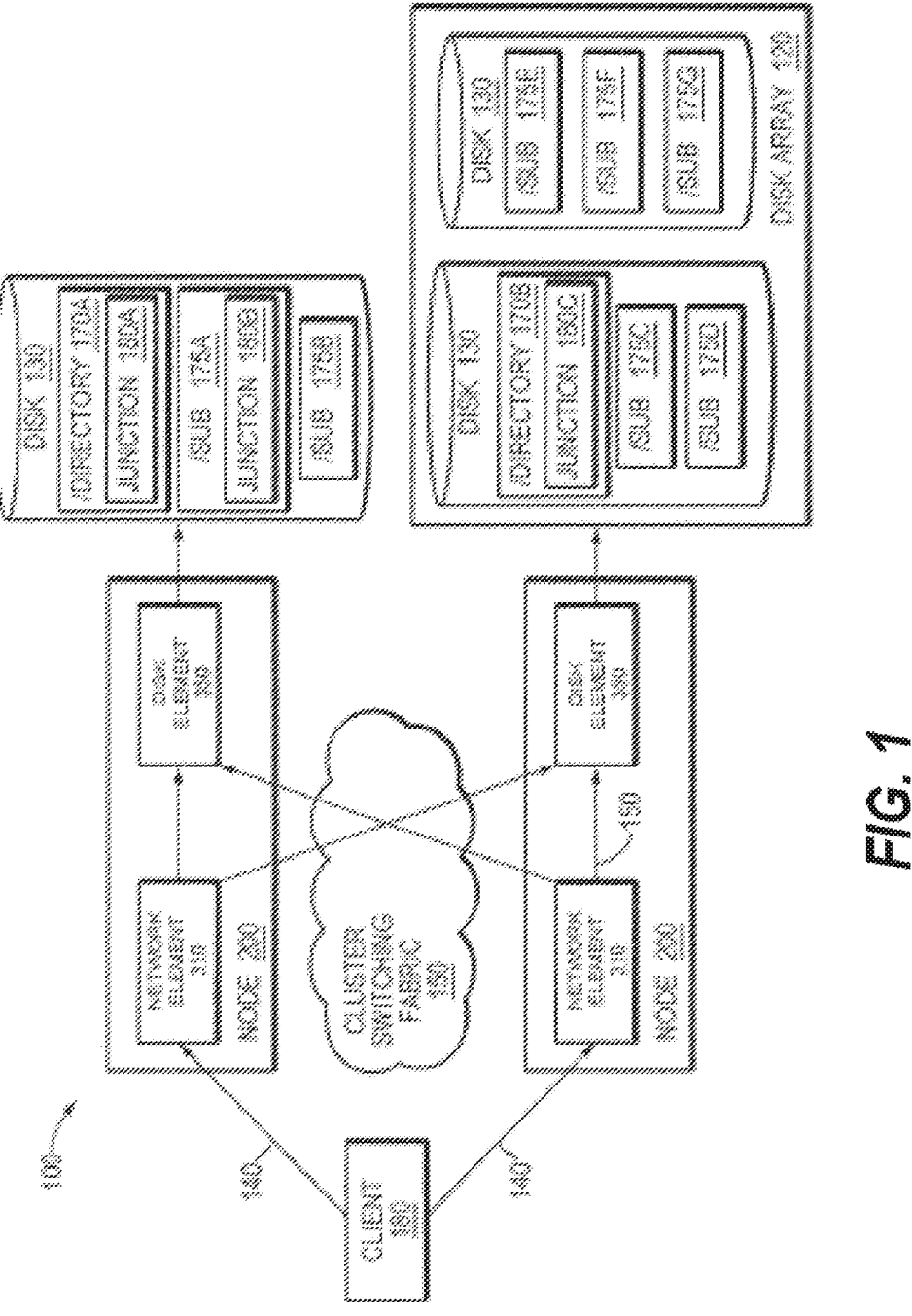
FIG. 1 is a block diagram illustrating a plurality of nodes interconnected as a cluster in accordance with an embodiment of the present disclosure.

Systems and methods are described for creation and retention of immutable snapshots to facilitate ransomware protection. As noted above, immutable backup copies of private data have been used to facilitate recovery from ransomware attacks. A backup represents a full copy of the original data, whereas a snapshot is a read-only, point-in-time image that consumes minimal storage space and incurs negligible performance overhead. The unique features of a Write Anywhere File Layout (WAFL) file system, which is available from NetApp, Inc. of San Jose, CA, makes possible low-overhead snapshots that contain metadata (e.g., pointers to data) instead of a copy of the underlying data. For example, the WAFL file system makes use of pointers to actual data blocks on disk and when data is updated, it does not rewrite existing blocks, but rather the updated data is stored in a new block and the pointer is updated. Since snapshots do not reference full copies of electronic files they can be performed (e.g., taken or created) very quickly. This use of block pointers allows access to older versions of files, directory hierarchies, and/or logical unit numbers (LUNs) with ease. One issue, however, with relying on snapshots to facilitate recovery from a ransomware attack is the fact they can be easily compromised by deletion during a ransomware attack. As such, a mechanism is described herein to make snapshots stored on any volume (e.g., a primary (source) volume of a first storage system or a secondary (destination) volume of a second storage system) incapable of deletion until an associated retention time has expired, thereby facilitating data recovery based on the use of retained snapshots taken prior to a ransomware attack. Additionally, flexible, policy-based approaches to creating and/or transferring snapshots are provided.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider or hyperscaler (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability and mobility (e.g., cloud bursting for load balancing between clouds).

As used herein, a "storage system" or "storage appliance" generally refers to a type of computing appliance or node, in virtual or physical form, that provides data to, or manages data for, other computing devices or clients (e.g., applications). The storage system may be part of a cluster representing a distributed storage system. In various examples described herein, a storage system may be run (e.g., on a VM or as a containerized instance, as the case may be) within a public cloud provider.

As used herein a "snapshot" generally refers to a file representing a point-in-time image of a dataset (e.g., a volume) containing metadata (e.g., that points to or otherwise identifies the underlying data) instead of including a copy of the underlying data. A non-limiting example of a snapshot is a NetApp snapshot copy.

As used herein a "snapshot policy" generally refers to a set of rules that controls creation, retention, mirroring, and/or expiration of snapshots. Snapshot policies may be used by a storage system administrator to facilitate the scheduling the creation of snapshots for volumes at specific intervals and the retention of snapshots based on their recovery point objectives (RPO). For example, when applied to a volume a snapshot schedule policy may specify one or more schedules (e.g., hourly, daily, weekly, monthly, etc.) on which snapshots are taken. Snapshots created in accordance with a rule associated with a given snapshot schedule policy may automatically be labeled with a label or tag (which may also be referred to herein as a snaplabel or snaplabel tag) associated with the snapshot schedule policy.

Example Distributed Storage System Cluster

FIG. 1 is a block diagram illustrating a plurality of nodes 200 interconnected as a cluster 100 in accordance with an embodiment of the present disclosure. The nodes 200 comprise various functional components that cooperate to provide a distributed storage system architecture of the cluster 100. To that end, in the context of the present example, each node 200 is generally organized as a network element 310 and a disk element 350. The network element 310 includes functionality that enables the node 200 to connect to clients (e.g., client 180) over a computer network 140, while each disk element 350 connects to one or more storage devices, such as disks 130 of a disk array 120. The nodes 200 are interconnected by a cluster switching fabric 150 which, in an example, may be embodied as a Gigabit Ethernet switch. It should be noted that while there is shown an equal number of network and disk elements in the illustrative cluster 100, there may be differing numbers of network and/or disk elements. For example, there may be a plurality of network elements and/or disk elements interconnected in a cluster configuration 100 that does not reflect a one-to-one correspondence between the network and disk elements. As such, the description of a node 200 comprising one network elements and one disk element should be taken as illustrative only.

Clients may be general-purpose computers configured to interact with the node 200 in accordance with a client/server model of information delivery. That is, each client (e.g., client 180) may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks. In various examples described herein, an administrative user (not shown) of the client may make use of a user interface (UI) presented by the cluster or a command line interface (CLI) of the cluster to, among other things, establish a data protection relationship between a source volume and a destination volume (e.g., a mirroring relationship specifying one or more policies associated with creation, retention, and transfer of snapshots), defining snapshot and/or backup policies, and association of snapshot policies with snapshots.

Disk elements 350 are illustratively connected to disks 130, that may be organized into disk arrays 120. Alternatively, storage devices other than disks may be utilized, e.g., flash memory, optical storage, solid state devices, etc. As such, the description of disks should be taken as exemplary only. As described below, in reference to FIG. 3, a file system 360 may implement a plurality of flexible volumes on the disks 130. Flexible volumes may comprise a plurality of directories 170 A, B and a plurality of subdirectories 175 A-G. Junctions 180 A-C may be located in directories 170 and/or subdirectories 175. It should be noted that the distribution of directories 170, subdirectories 175 and junctions 180 shown in FIG. 1 is for illustrative purposes. As such, the description of the directory structure relating to subdirectories and/or junctions should be taken as exemplary only.

Example Storage System Node

Figure 2:
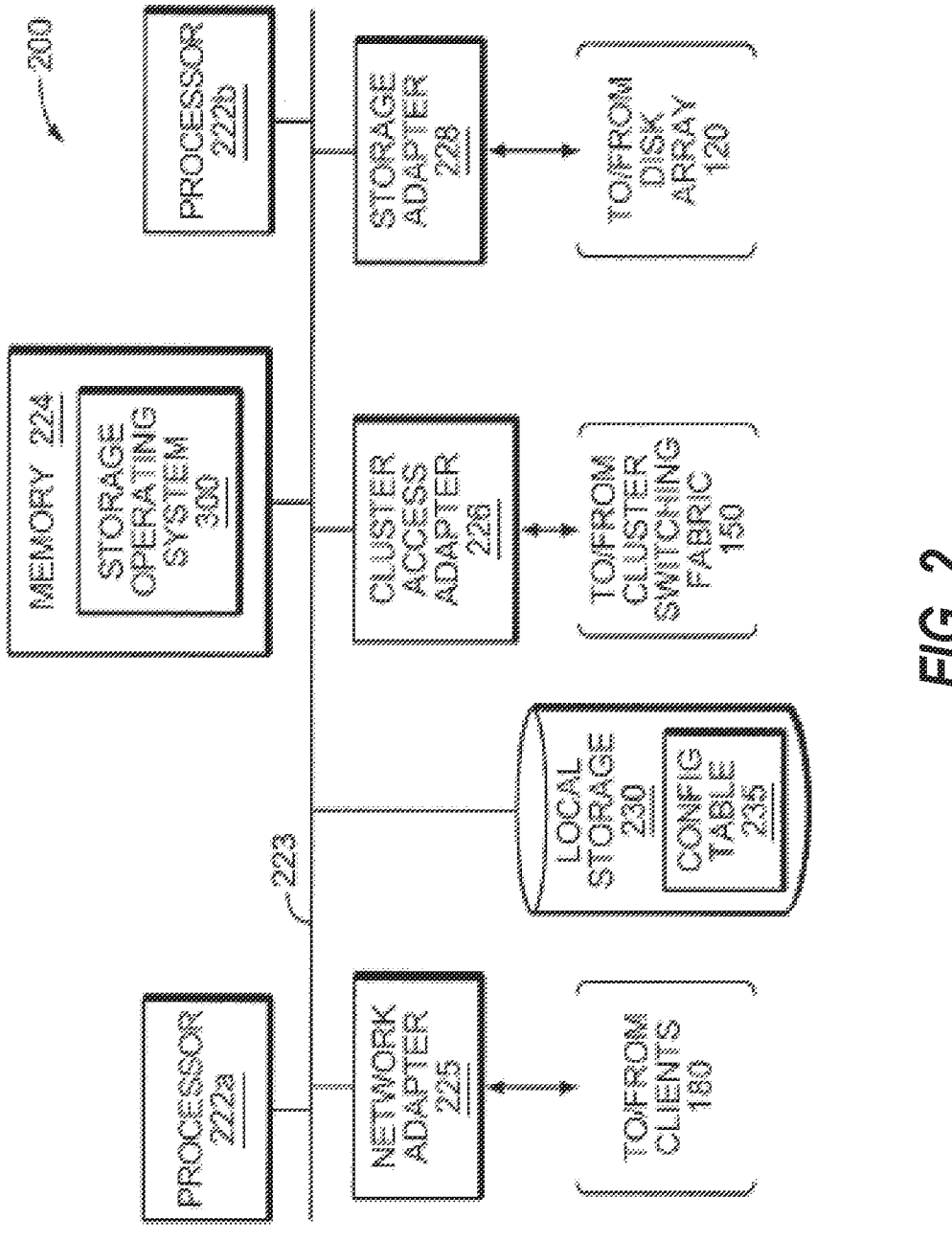
FIG. 2 is a block diagram illustrating a node in accordance with an embodiment of the present disclosure.

FIG. 2 is a block diagram of a node 200 that is illustratively embodied as a storage system comprising a plurality of processors (e.g., processors 222a-b), a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235). The cluster access adapter 226 comprises a plurality of ports adapted to couple the node 200 to other nodes of the cluster 100. Illustratively, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, the cluster access adapter 226 is utilized by the network and disk element for communicating with other network and disk elements in the cluster 100.

In the context of the present example, each node 200 is illustratively embodied as a dual processor storage system executing a storage operating system 300 that implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor (e.g., processor 222a) executes the functions of the network element 310 on the node, while the other processor (e.g., processor 222b) executes the functions of the disk element 350.

The memory 224 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the disclosure described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to a network (e.g., computer network 140). Illustratively, the network may be embodied as an Ethernet network or a Fibre Channel (FC) network. Each client (e.g., client 180) may communicate with the node over network by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electromechanical and any other similar media adapted to store information, including data and parity information. However, as illustratively described herein, the information is stored on disks (e.g., disks 130 of array 120). The storage adapter comprises a plurality of ports having input/output (I/O) interface circuitry that couples to the disks over an I/O interconnect arrangement, such as a conventional high-performance, FC link topology.

Storage of information on each array (e.g., array 120) may be implemented as one or more storage "volumes" that comprise a collection of physical storage disks (e.g., disks 130) cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and appropriate storing of parity information with respect to the striped data. An illustrative example of a RAID implementation is a RAID-4 level implementation, although it should be understood that other types and levels of RAID implementations may be used in accordance with the inventive principles described herein.

While in the context of the present example, the node may be a physical host, it is to be appreciated the node may be implemented in virtual form. For example, a storage system may be run (e.g., on a VM or as a containerized instance, as the case may be) within a public cloud provider. As such a cluster representing a distributed storage system may be comprised of multiple physical nodes (e.g., node 200) or multiple virtual nodes (virtual storage systems).

Example Storage Operating System

To facilitate access to the disks (e.g., disks 130), a storage operating system (e.g., storage operating system 300) may implement a write-anywhere file system that cooperates with one or more virtualization modules to "virtualize" the storage space provided by disks. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

Illustratively, the storage operating system may be the Data ONTAP® operating system available from NetApp™, Inc., San Jose, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this disclosure.

Figure 3:
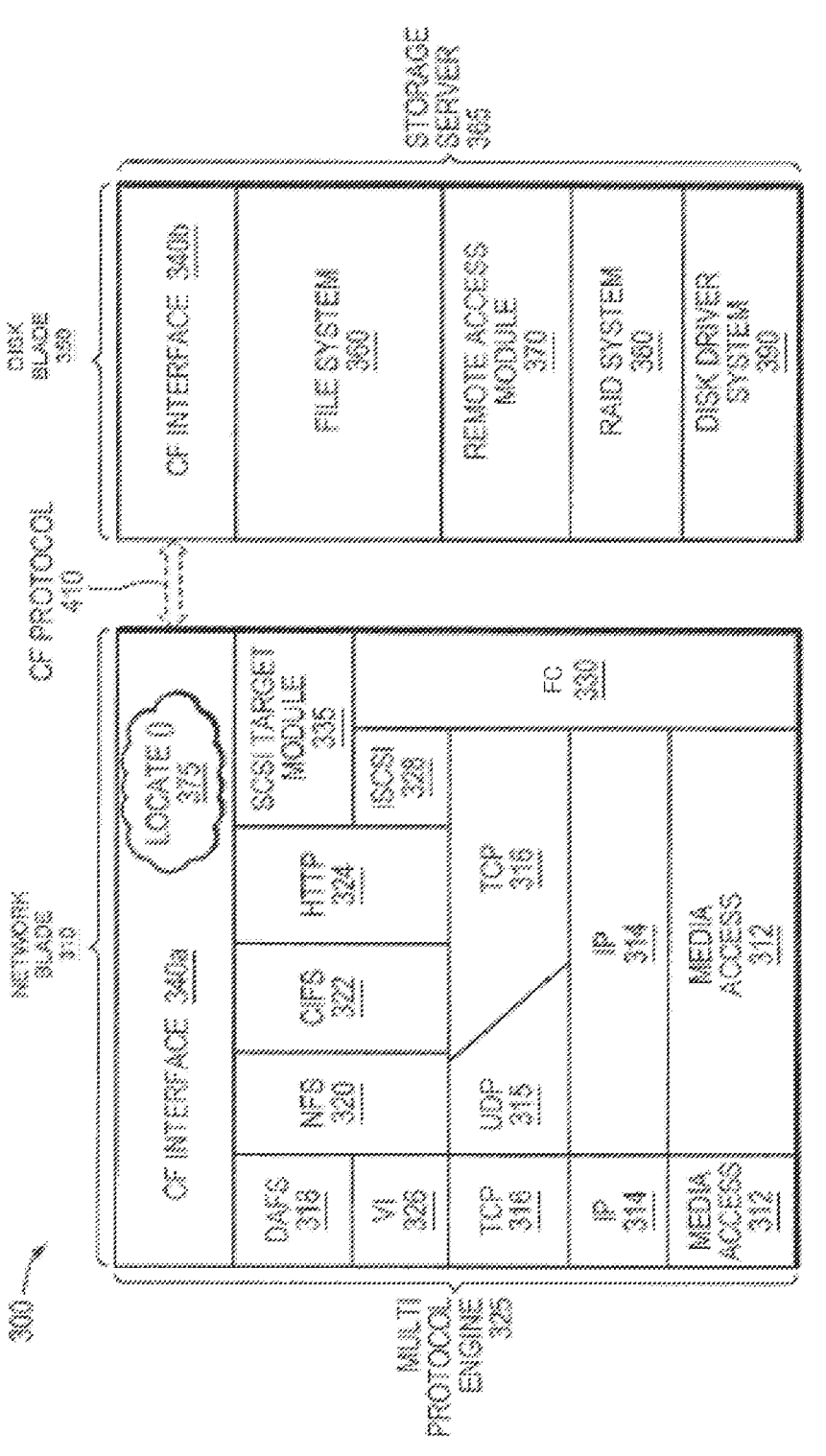
FIG. 3 is a block diagram illustrating a storage operating system in accordance with an embodiment of the present disclosure.

FIG. 3 is a block diagram illustrating a storage operating system 300 in accordance with an embodiment of the present disclosure. In the context of the present example, the storage operating system 300 is shown including a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as ROMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node (e.g., node 200).

In addition, the storage operating system includes a series of software layers organized to form a storage server 365 that provides data paths for accessing information stored on the disks (e.g., disks 130) of the node. To that end, the storage server 365 includes a file system module 360 in cooperating relation with a remote access module 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, for example, a virtual disk (vdisk) module (not shown) and a SCSI target module 335. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements an exemplary a file system having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from a client (e.g., client 180) is forwarded as a packet over a computer network (e.g., computer network 140) and onto a node (e.g., node 200) where it is received at a network adapter (e.g., network adaptor 225). A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

The remote access module 370 is operatively interfaced between the file system module 360 and the RAID system module 380. Remote access module 370 is illustratively configured as part of the file system to implement the functionality to determine whether a newly created data container, such as a subdirectory, should be stored locally or remotely. Alternatively, the remote access module 370 may be separate from the file system. As such, the description of the remote access module being part of the file system should be taken as exemplary only. Further, the remote access module 370 determines which remote flexible volume should store a new subdirectory if a determination is made that the subdirectory is to be stored remotely. More generally, the remote access module 370 implements the heuristics algorithms used for the adaptive data placement. However, it should be noted that the use of a remote access module should be taken as illustrative. In alternative aspects, the functionality may be integrated into the file system or other module of the storage operating system. As such, the description of the remote access module 370 performing certain functions should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180.

Alternatively, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computer, including a standalone computer or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

Example Cluster Fabric (CF) Protocol

Illustratively, the storage server 365 is embodied as disk element 350 of the storage operating system 300 to service one or more volumes of array 120. In addition, the multiprotocol engine 325 is embodied as network element 310 to (i) perform protocol termination with respect to a client issuing incoming data access request packets over the network 140, as well as (ii) redirect those data access requests to any storage server 365 of the cluster 100. Moreover, the network element 310 and disk element 350 cooperate to provide a highly scalable, distributed storage system architecture of the cluster 100. To that end, each module includes a cluster fabric (CF) interface module 340 *a,b* adapted to implement intra-cluster communication among the modules, including disk element to disk element communication for data container striping operations described herein.

The protocol layers, e.g., the NFS/CIFS layers and the iSCSI/IFC layers, of the network element 310 function as protocol servers that translate file-based and block based data access requests from clients into CF protocol messages used for communication with the disk element 350. That is, the network element servers convert the incoming data access requests into file system primitive operations (commands) that are embedded within CF messages by the CF interface module 340 for transmission to the disk elements 350 of the cluster 100. Notably, the CF interface modules 340 cooperate to provide a single file system image across all disk elements 350 in the cluster 100. Thus, any network port of a network element that receives a client request can access any data container within the single file system image located on any disk element 350 of the cluster.

Further, in an illustrative aspect of the disclosure, the network element 310 and disk element 350 are implemented as separately scheduled processes of storage operating system 300; however, in an alternate aspect, the modules may be implemented as pieces of code within a single operating system process. Communication between a network element and disk element is thus illustratively effected through the use of message passing between the modules although, in the case of remote communication between a network element and disk element of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp™, Inc.

The CF interface module 340 implements the CF protocol for communicating file system commands among the modules of cluster 100. Communication is illustratively effected by the disk element exposing the CF API to which a network element (or another disk element) issues calls. To that end, the CF interface module 340 is organized as a CF encoder and CF decoder. The CF encoder of, e.g., CF interface 340 *a* on network element 310 encapsulates a CF message as (i) a local procedure call (LPC) when communicating a file system command to a disk element 350 residing on the same node 200 or (ii) a remote procedure call (RPC) when communicating the command to a disk element residing on a remote node of the cluster 100. In either case, the CF decoder of CF interface 340 *b* on disk element 350 de-encapsulates the CF message and processes the file system command.

Illustratively, the remote access module 370 may utilize CF messages to communicate with remote nodes to collect information relating to remote flexible volumes. A CF message is used for RPC communication over the switching fabric 150 between remote modules of the cluster 100; however, it should be understood that the term "CF message" may be used generally to refer to LPC and RPC communication between modules of the cluster. The CF message includes a media access layer, an IP layer, a UDP layer, a reliable connection (RC) layer and a CF protocol layer. The CF protocol is a generic file system protocol that conveys file system commands related to operations contained within client requests to access data containers stored on the cluster 100; the CF protocol layer is that portion of a message that carries the file system commands. Illustratively, the CF protocol is datagram based and, as such, involves transmission of messages or "envelopes" in a reliable manner from a source (e.g., a network element 310) to a destination (e.g., a disk element 350). The RC layer implements a reliable transport protocol that is adapted to process such envelopes in accordance with a connectionless protocol, such as UDP.

Example File System Organization

In one embodiment, a data container is represented in the write-anywhere file system as an inode data structure adapted for storage on the disks (e.g., disks 130). In such an embodiment, an inode includes a meta-data section and a data section. The information stored in the meta-data section of each inode describes the data container (e.g., a file, a snapshot, etc.) and, as such, includes the type (e.g., regular, directory, vdisk) of file, its size, time stamps (e.g., access and/or modification time) and ownership (e.g., user identifier (UID) and group ID (GID), of the file, and a generation number. The contents of the data section of each inode may be interpreted differently depending upon the type of file (inode) defined within the type field. For example, the data section of a directory inode includes meta-data controlled by the file system, whereas the data section of a regular inode includes file system data. In this latter case, the data section includes a representation of the data associated with the file.

Specifically, the data section of a regular on-disk inode may include file system data or pointers, the latter referencing 4 KB data blocks on disk used to store the file system data. Each pointer is preferably a logical vbn to facilitate efficiency among the file system and the RAID system when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section of the inode (e.g., a second level inode) references an indirect block (e.g., a first level L1 block) that contains 1024 pointers, each of which references a 4 KB data block on disk. For file system data having a size greater than 64 MB, each pointer in the data section of the inode (e.g., a third level L3 inode) references a double-indirect block (e.g., a second level L2 block) that contains 1024 pointers, each referencing an indirect (e.g., a first level L1) block. The indirect block, in turn, which contains 1024 pointers, each of which references a 4 kB data block on disk. When accessing a file, each block of the file may be loaded from disk 130 into the memory 224. In other embodiments, higher levels are also possible that may be used to handle larger data container sizes.

When an on-disk inode (or block) is loaded from disk 130 into memory 224, its corresponding in-core structure embeds the on-disk structure. The in-core structure is a block of memory that stores the on-disk structure plus additional information needed to manage data in the memory (but not on disk). The additional information may include, e.g., a "dirty" bit. After data in the inode (or block) is updated/modified as instructed by, e.g., a write operation, the modified data is marked "dirty" using the dirty bit so that the inode (block) can be subsequently "flushed" (stored) to disk.

According to one embodiment, a file in a file system comprises a buffer tree that provides an internal representation of blocks for a file loaded into memory 224 and maintained by the write-anywhere file system 360. A root (top-level) buffer, such as the data section embedded in an inode, references indirect (e.g., level 1) blocks. In other embodiments, there may be additional levels of indirect blocks (e.g., level 2, level 3) depending upon the size of the file. The indirect blocks (e.g., and inode) includes pointers that ultimately reference data blocks used to store the actual data of the file. That is, the data of file are contained in data blocks and the locations of these blocks are stored in the indirect blocks of the file. Each level 1 indirect block may include pointers to as many as 1024 data blocks. According to the "write anywhere" nature of the file system, these blocks may be located anywhere on the disks 130.

In one embodiment, a file system layout is provided that apportions an underlying physical volume into one or more virtual volumes (or flexible volume) of a storage system, such as node 200. In such an embodiment, the underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In a further embodiment, pvbns are used as block pointers within buffer trees of files stored in a flexible volume. This "hybrid" flexible volume example involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

In a dual vbn hybrid flexible volume example, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks.

A root (top-level) buffer, such as the data section embedded in an inode, references indirect (e.g., level 1) blocks. Note that there may be additional levels of indirect blocks (e.g., level 2, level 3) depending upon the size of the file. The indirect blocks (and inode) include pvbn/vvbn pointer pair structures that ultimately reference data blocks used to store the actual data of the file. The pvbns reference locations on disks of the aggregate, whereas the vvbns reference locations within files of the flexible volume. The use of pvbns as block pointers in the indirect blocks provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Example Aggregate

Figure 4:
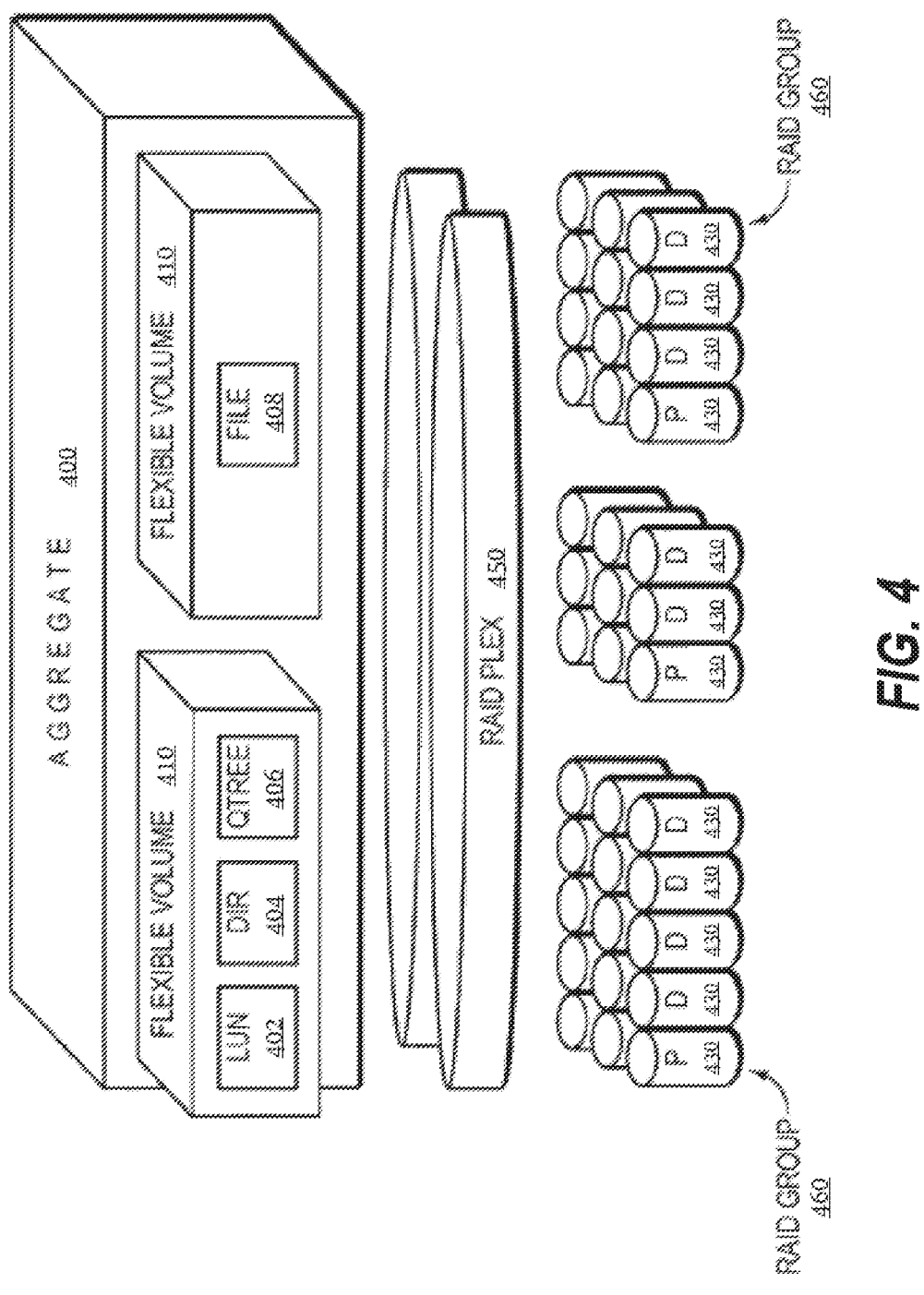
FIG. 4 is a block diagram illustrating an aggregate in accordance with an embodiment of the present disclosure.

FIG. 4 is a block diagram illustrating an aggregate 400 in accordance with an embodiment of the present disclosure Luns (blocks) 402, directories 404, qtrees 406 and files 408 may be included within flexible volumes 410, such as dual vbn flexible volumes, that, in turn, are contained within the aggregate 400. In one embodiment, the flexible volumes 410 include elements within the flexible volumes that may comprise junctions to provide redirection information to other flexible volumes, which may be contained within the same aggregate 400, may be stored in aggregate service by other key modules in the distributed file system. The description of elements being stored within a flexible volume 410 should be taken as exemplary only. The aggregate 400 is illustratively layered on top of the RAID system, which is represented by at least one RAID plex 450 (depending upon whether the storage configuration is mirrored), wherein each plex 450 comprises at least one RAID group 460. Each RAID group further comprises a plurality of disks 430, e.g., one or more data (D) disks and at least one (P) parity disk.

Whereas the aggregate 400 is analogous to a physical volume of a conventional storage system, a flexible volume is analogous to a file within that physical volume. That is, the aggregate 400 may include one or more files, wherein each file contains a flexible volume 410 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 410 is also a logical volume, it has its own block allocation structures (e.g., active, space and summary maps) in its vvbn space.

A container file is a file in the aggregate that includes all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories for flexible volumes.

Specifically, a physical file system directory includes a subdirectory for each flexible volume in the aggregate, with the name of subdirectory being a file system identifier (fsid) of the flexible volume. Each fsid subdirectory (flexible volume) contains at least two files, a file system file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Example On-Disk Representation of an Aggregate

Figure 5:
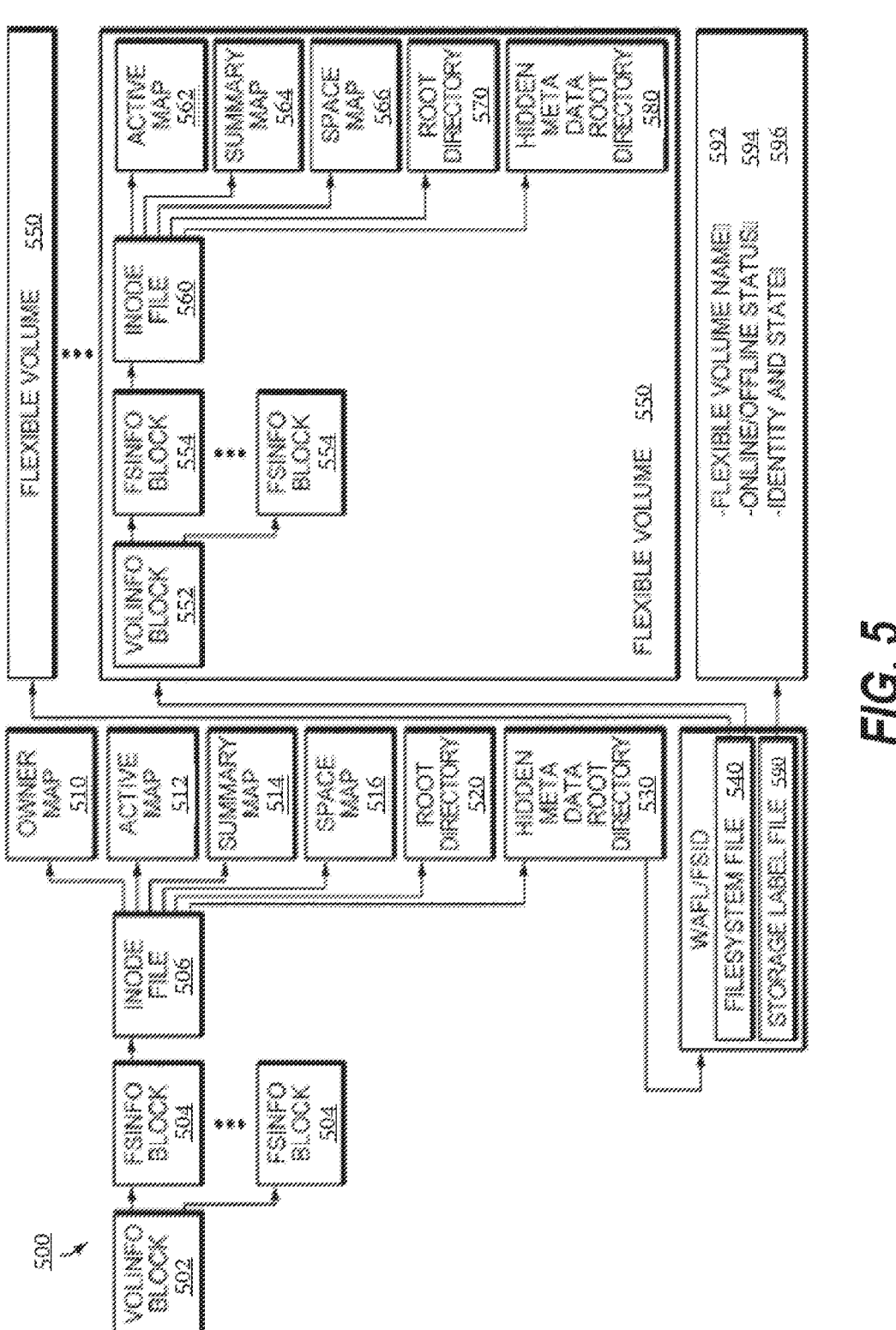
FIG. 5 is a block diagram illustrating an on-disk layout of an aggregate in accordance with an embodiment of the present disclosure.

FIG. 5 is a block diagram illustrating an on-disk layout of an aggregate 500 in accordance with an embodiment of the present disclosure. The storage operating system 300, e.g., the RAID system 380, assembles a physical volume of pvbns to create the aggregate 500, with pvbns 1 and 2 comprising a "physical" volinfo block 502 for the aggregate. The volinfo block 502 contains block pointers to fsinfo blocks 504, each of which may represent a snapshot of the aggregate. Each fsinfo block 504 includes a block pointer to an inode file 506 that contains inodes of a plurality of files, including an owner map 510, an active map 512, a summary map 514 and a space map 516, as well as other special meta-data files. The inode file 506 further includes a root directory 520 and a "hidden" meta-data root directory 530, the latter of which includes a namespace having files related to a flexible volume in which users cannot "see" the files. The hidden meta-data root directory includes the WAFL/ fsid/directory structure that contains file system file 540 and storage label file 590. Note that root directory 520 in the aggregate is empty; all files related to the aggregate are organized within the hidden meta-data root directory 530. In various examples described herein, the hidden meta-data root directory 530 may represent a non-limited example of a private inode space (e.g., not accessible to end users and being accessible to a limited number of workflows of the storage system) in which private (or locked) metafiles associated with snapshots may be stored to enforce immutability of snapshots during a defined retention time period. For example, as described further below, a retention time may be stored in a lock metafile associated with a snapshot to preclude modification and/or deletion of the snapshot until the current time (e.g., as indicated by a secure time base, such as a tamper-proof timer) is greater than or equal to the retention time. In this manner, snapshots may be retained (e.g., on a source volume and/or on a destination volume in locked or read-only form) to facilitate recovery from a ransomware attack, malware, or other cybersecurity threats.

In addition to being embodied as a container file having level 1 blocks organized as a container map, the file system file 540 includes block pointers that reference various file systems embodied as flexible volumes 550. Each flexible volume 550 has special reserved inode numbers within its flexible volume space that are used for, among other things, the block allocation bitmap structures. As noted, the block allocation bitmap structures, e.g., active map 562, summary map 564 and space map 566, are located in each flexible volume.

Specifically, each flexible volume 550 has the same inode file structure/content as the aggregate, with the exception that there is no owner map and no WAFL/fsid/file system file, storage label file directory structure in a hidden meta-data root directory 580. To that end, each flexible volume 550 has a volinfo block 552 that points to one or more fsinfo blocks 554, each of which may represent a snapshot, along with the active file system of the flexible volume. Each fsinfo block, in turn, points to an inode file 560 that, as noted, has the same inode structure/content as the aggregate with the exceptions noted above. Each flexible volume 550 has its own inode file 560 and distinct inode space with corresponding inode numbers, as well as its own root directory 570 and subdirectories of files that can be exported separately from other flexible volumes.

The storage label file 590 contained within the hidden meta-data root directory 530 of the aggregate is a small file that functions as an analog to a conventional raid label. A raid label includes physical information about the storage system, such as the volume name; that information is loaded into the storage label file 590. Illustratively, the storage label file 590 includes the name 592 of the associated flexible volume 550, the online/offline status 594 of the flexible volume, and other identity and state information 596 of the associated flexible volume (whether it is in the process of being created or destroyed).

Example Source Cluster and Destination Cluster

Figure 6:
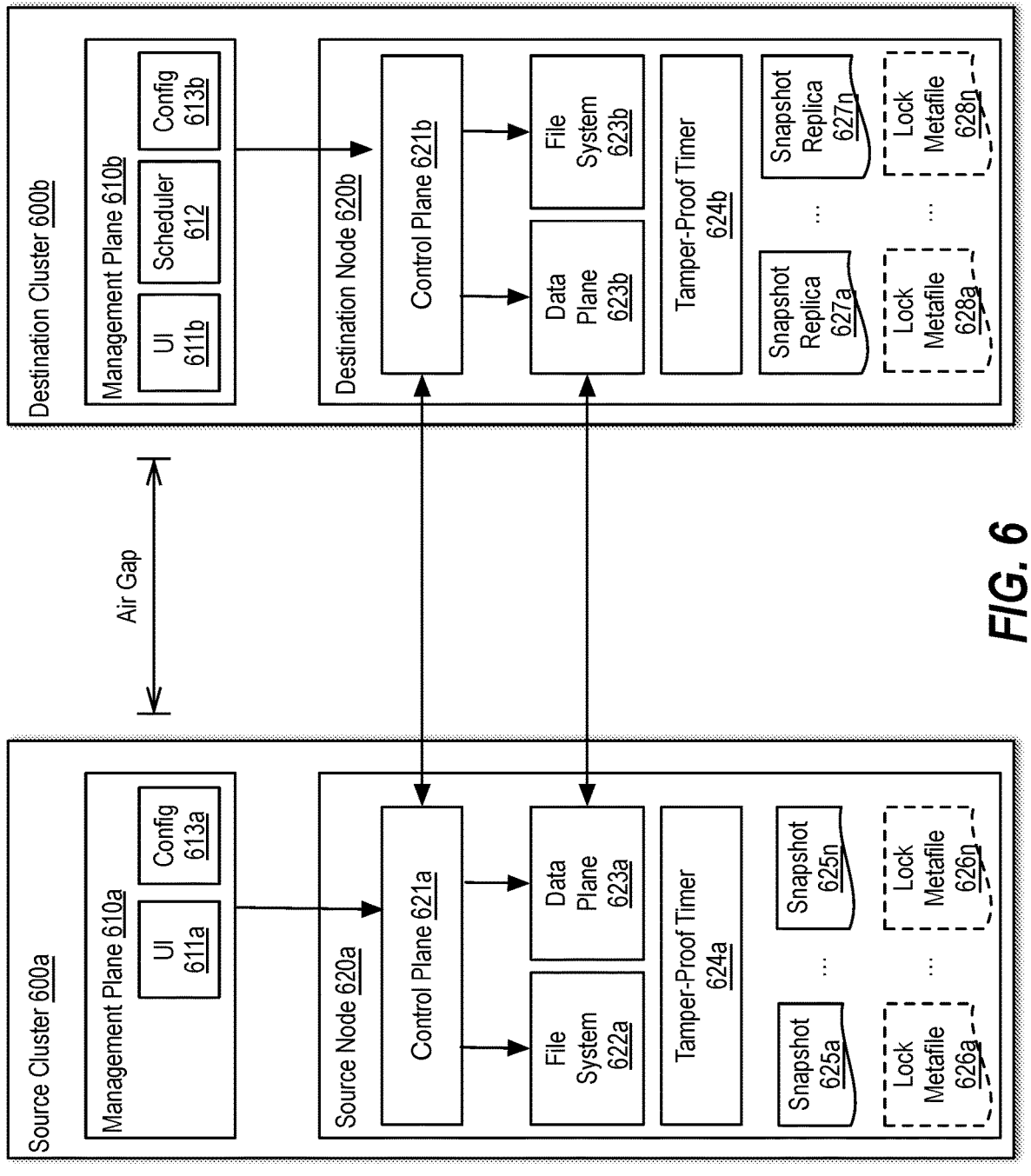
FIG. 6 is a block diagram illustrating a high-level architecture of a source cluster and a destination cluster in accordance with an embodiment of the present disclosure.

FIG. 6 is a block diagram illustrating a high-level architecture of a source cluster 600a and a destination cluster 600b in accordance with an embodiment of the present disclosure. In the context of the present example, source cluster 600a and destination cluster 600b are each shown with respective management planes (e.g., management planes 610a and 610b), respective nodes (e.g., a source node 620a and a destination node 620b). The source cluster 600a and destination cluster 600b may be analogous to cluster 100 and the source node 620a and the destination node 620b may be analogous to node 200. While in the context of the present example, only a single node is shown within each cluster, it is to be appreciated the clusters may include multiple nodes.

The management planes may be responsible for managing configuration information, including policies (e.g., snapshot schedule policies, snapshot backup policies, and snapshot mirroring policies) and relationships (e.g., data protection relationships between source volumes and destination volumes, relationships between policies and volumes). The management planes may also be responsible for schedules. For example, as described further below, management plane 610a may be responsible for triggering the creation of volume-level snapshots (e.g., snapshots 625a-n) in accordance with rules specified by a snapshot backup policy and management plane 610b may be responsible for causing snapshots to be transferred from a source volume (not shown) of the source node 620a to a destination volume (not shown) of the destination node 620b in accordance with rules specified by a snapshot mirroring policy.

Management plane 610a is shown including a source cluster UI (e.g., UI 611a) and a configuration module (e.g., configuration module 613a). UI 611a may be used by an administrative user to, among other things, create, modify, and/or delete snapshot schedule policies, associate and/or disassociate a given snapshot schedule policy with a source volume (not shown) of the source node 620a, manually tag or label snapshots with labels of desired snapshot schedule policies (e.g., hourly, daily, weekly, and monthly), and/or when locking is enabled for the source volume, manually assign a retention time to a given snapshot during or after its creation. The configuration module may maintain a replicated database that includes cluster configuration information. Non-limiting examples of configuration information relevant to the present disclosure is described further below with reference to FIG. 7.

Management plane 610b is shown including a destination cluster UI (e.g., UI 611b), a configuration module (e.g., configuration module 613b), and a scheduler service (e.g., scheduler 612). Snapshot mirroring functionality and configuration thereof may be destination managed. In one embodiment, cross-cluster concurrency control is provided by limiting performance of management functions associated with data protection relationships (e.g., mirroring relationships) between a given source volume and a given destination volume to the destination cluster hosting the given destination volume. For example, creation and/or modification of configuration information associated with a data protection relationship involving a destination volume hosted by the destination cluster 600b may be limited to being performed via configuration module 613b and UI 611b. In this manner, cross-cluster concurrency control is provided without the need for implementing a potentially complex distributed locking mechanism. For example, source cluster managed relationships would otherwise require such a mechanism to prevent multiple entities (remote) from modifying and/or updating a single destination. The destination management approach also eliminates the need for inter-cluster synchronization and instead allows the snapshot mirroring function to rely on the replicated configuration database for synchronization or relationships and configuration changes. As above, the configuration module may maintain a copy of the replicated database that includes cluster configuration information. Non-limiting examples of configuration information utilized by the destination cluster 600b and relevant to the present disclosure is described further below with reference to FIG. 8.

In addition to destination managed configuration, as described further below, the transfer of snapshots from a given source volume to a given destination volume that are part of a given data protection relationship may also be triggered by the destination node. For example, the scheduler service may periodically direct the control plane 621b to coordinate transfer of snapshots created on a given source volume (e.g., created since the last mirroring cycle) of a given mirroring relationship to the given destination volume of the given mirroring relationship. In one embodiment, like snapshot creation, snapshot mirroring may be performed in a policy-based manner in which rules specified by a snapshot mirroring policy are periodically evaluated and carried out in accordance with a schedule implemented by the scheduling service. While in the context of various examples described herein, snapshot management is used to decouple the creation of snapshots on the source node 620a from the transfer of the snapshots (e.g., snapshot replicas 627a-n) to the destination node 620b, it is to be appreciated in other examples, the transfer of snapshots may be triggered responsive to snapshot creation.

In the context of the present example, the source node 620a and the destination node 620b are shown including respective control planes (e.g., control plane 621a and 621b), respective data planes (e.g., data planes 623a and 623b), respective file systems (e.g., file systems 622a and 622b), and respective tamper-proof timers (e.g., tamper-proof timer 624a and 624b). The control planes may be responsible for, among other things, providing concurrency control infrastructure at the volume level, snapshot creation, snapshot transfer negotiations, and communication with respective data planes. A recovery point manager (RPM) (not shown) may expedite the creation of source snapshots as soon as the schedule (e.g., one or more rules specified by a snapshot backup policy) calls for it. The control planes may expose the snapshot services provided on behalf of the management planes via application programming interfaces (APIs).

The data planes may be responsible for, among other things, providing storage efficient transfers of snapshots from a given source volume to a given destination volume as initiated by the control planes. Depending upon the particular implementation the data planes may utilize one or more replication engines for block replication and/or logical replication for volume endpoints. In one embodiment, both replication engines operate at the volume level, but have different characteristics. For example, a block replication engine (BRE) may replicate volumes using volume block (VVBN) reading and writing and may use knowledge of the file system to determine differences between snapshots at the block allocation level. In contrast, logical replication with storage efficiency (LRSE) may replicate data in volumes using inode-level (inodes and buftrees) reading and writing operations and uses knowledge of the file system to determine differences between snapshots at the indirect pointer level. LRSE may also uses block-level metadata to pass storage efficiency information from one side to the other.

The file systems (e.g., WAFL) may be responsible for, among other things, file system snapshot creation and deletion, providing an interface through which a tags/labels may be added to, deleted from a given snapshot as well as modified. The file systems may also provide volume and snapshot information to the control plane to facilitate snapshot transfer setup.

The tamper-proof timers may each represent a secure clocking mechanism (e.g., a secure time base). The time/date of a given tamper-proof timer (which cannot be reset after initialization) may be used as a current time from which a retention time may be calculated for a given snapshot based on the retention period associated with the snapshot. The tamper-proof timers may be initialized with a time value upon creation, stored in memory, updated independently of the system time, and used to determine whether a locked snapshot can be deleted or is to be retained. Traditional system clocks are not used for data protection (e.g., ransomware protection), such as retention of locked snapshots for a specified retention period, as system clocks may be modified thereby allowing the retention period to be subverted. For example, using a system clock alone, a locked snapshot desired to be retained for one month may easily be deleted by changing the system clock to a time past the one month date and subsequently deleting the snapshot.

Snapshots (e.g., snapshots 625a-n and snapshot replicas 627a-n) may each have a snapshot instance identifier (ID) or simply a snapshot ID that is unique (at least within the volume on which it is stored). The snapshot ID may be used to associate a given snapshot (e.g., snapshot 625a) with its corresponding lock metafile (e.g., lock metafile 626a). Snapshots may also include tags or labels. The tags or labels may include user tags/labels that are administrator-entered information used for informational only purposes or system-set information used for informational purposes by administrative users. In either case, the tags/labels may additionally be used by snapshot management functionality to determine which snapshots to replicate and how long to retain them.

Snapshots may include volume-level or file system level snapshots created automatically as a result of evaluation of a rule of a snapshot schedule policy or created responsive to a command received from an administrative user. Snapshots may also include those requested to be created by an application. For example, for a volume that is part of an Oracle database, the Oracle database may request an application-consistent snapshot be taken on a daily basis or in accordance with another schedule.

Snapshots may be locked or unlocked. Locked snapshots are snapshots having an associated non-zero retention period and stored on a volume for which snapshot locking is enabled (which may also be referred to as snapshot retention being enabled). In various embodiments described herein, locked snapshots have corresponding lock metafiles (e.g., lock metafiles 626a-n and lock metafiles 628a-n) stored in a private inode space so as to preclude their deletion until the current time is greater than or equal to the immutable retention time contained within the corresponding lock metafile. Unlocked snapshots are snapshots having a non-zero retention period and stored on a volume for which locking is not enabled or having a retention period of zero.

In one embodiment, multiple use cases are supported for retention of snapshots, including (i) maintaining locked snapshots on a source volume on which they were originally created for at least the associated retention period; (ii) maintaining locked snapshots on the source volume, replicating the locked snapshots to a destination volume, and also maintaining the replicas of the locked snapshots (e.g., snapshot replicas 627a-n) on the destination volume for at least the associated retention period; and (iii) maintaining unlocked snapshots, replicating the unlocked snapshots to a destination volume, locking the replicated snapshots on the destination volume when the associated retention period is non-zero, and thereafter maintaining the replicas of the locked snapshots on the destination volume for at least the associated retention period. A non-limiting example of how snapshots may be locked at the time of snapshot creation on a source volume is described below with reference to FIG.

11. A non-limiting example of how snapshots may be locked at the time of snapshot transfer to a destination volume is described below with reference to FIG. 13. A non-limiting example of deletion or retention of a locked snapshot, as the case may be, responsive to a delete operation is described below with reference to FIG. 14.

Example Source Cluster Configuration Information

Figure 7:
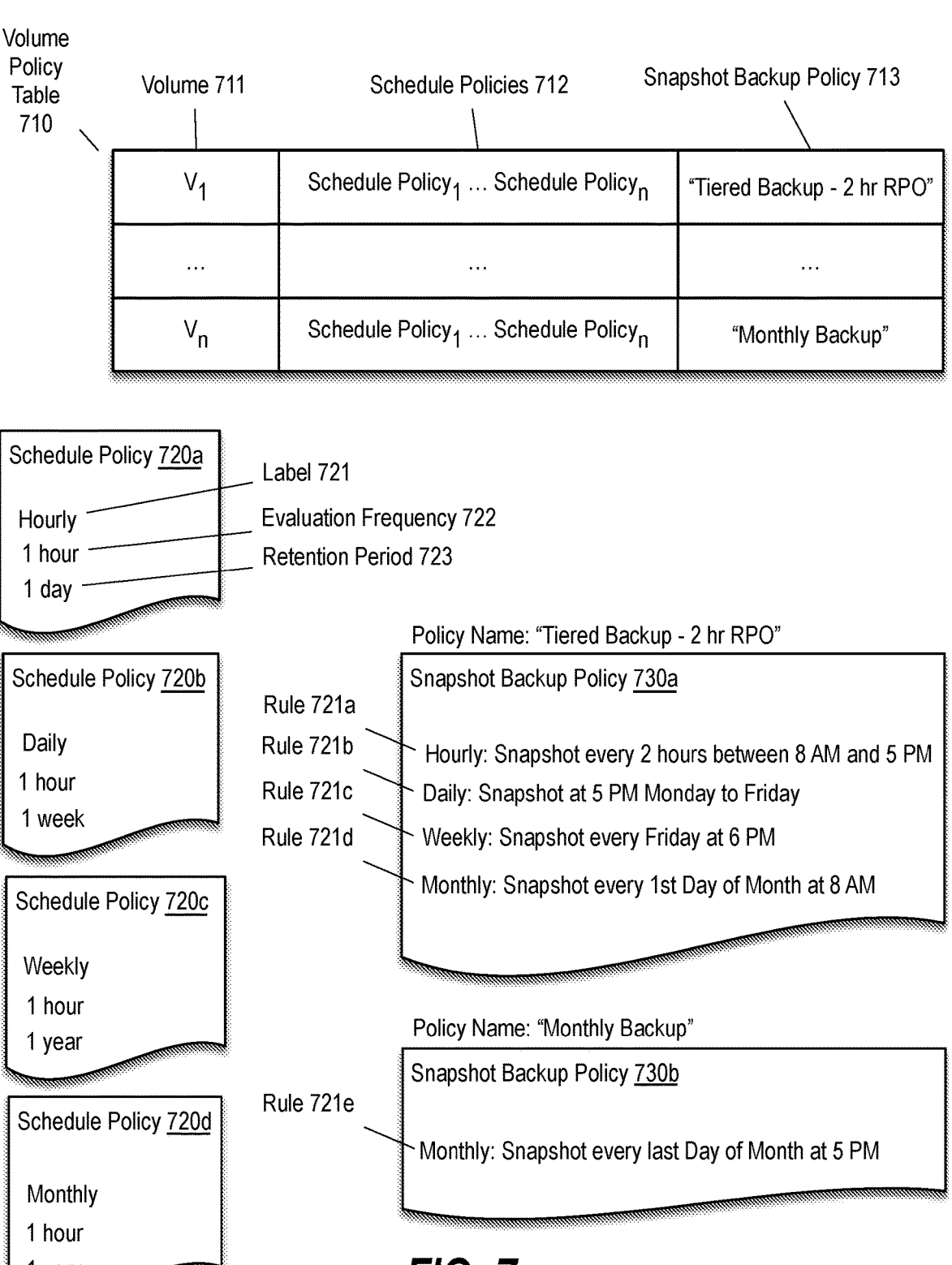
FIG. 7 is a block diagram conceptually illustrating examples of a volume policy table, schedule policies, and snapshot backup policies in accordance with an embodiment of the present disclosure.

FIG. 7 is a block diagram conceptually illustrating examples of a volume policy table (e.g., volume policy table 710), schedule policies (e.g., schedule policies 720*a-d*), and snapshot backup policies (e.g., snapshot backup policies 730*a-b*) in accordance with an embodiment of the present disclosure. The volume policy table, the schedule policies, and the snapshot backup policies represent non-limiting examples of configuration information (which may be analogous to config table 235) that may be maintained (e.g., within the replicated configuration database) and utilized by a source cluster (e.g., source cluster 600*a*) in connection with supporting performance of snapshot creation and/or mirroring functionality.

In the context of the present example, the volume policy table 710 may include an entry for each volume 711 (e.g., $V_1 \ldots V_n$) associated with the source cluster. Each entry may identify one or more snapshot schedule policies (e.g., schedule policies 712) associated with the volume and a snapshot backup policy 713.

Non-limiting examples of snapshot schedule policies include schedule policy 720*a-d*. Schedule policy 720*a* defines various attributes associated with hourly snapshots, including a tag or label (e.g., label 721), an evaluation frequency 722, and a retention period 723. Schedule policies 720*b-d* define various attributes associated with daily snapshots, weekly snapshots, and monthly snapshots, respectively.

The label 721 (which may also be referred to herein as a "snaplabel" or "snaplabel tag") may be automatically created for a snapshot at the time the snapshot is created. For example, snapshots created in accordance with schedule policy 720*a* may automatically be labeled with the snaplabel tag "Hourly." Similarly, snapshots created as a result of schedule policy 720*b*, 720*c*, or 720*d* may be automatically labeled with the snaplabel tag "Daily," "Weekly," or "Monthly," respectively. Snapshots created responsive to a request of an application may be labeled to include information about the application and the nature of the snapshot. For example, a daily application-consistent snapshot requested by an Oracle database may be labeled as "Oracle consistent." Snapshots created as a result of manual initiation by an administrative user may be defaulted to a null or blank label that may be subsequently modified via UI 611*a* or via a CLI, for example, by associating the snapshot with a given snapshot schedule policy or by directly selecting or keying in the desired label text.

The evaluation frequency 722 of a given schedule policy may be used to specify a desired interval (e.g., 1 hour) for evaluating whether a certain snapshot type (e.g., hourly snapshots, daily snapshots, weekly snapshots, or monthly snapshots) are to be created with reference to corresponding rules contained within a snapshot backup policy (e.g., snapshot backup policy 730*a*). The retention period 723 of a given schedule policy defines a period of time for which a snapshot created as a result of the given schedule policy or subsequently manually associated with the given schedule policy is to be retained (precluded from being deleted). For purposes of illustration, a schedule policy specifying a retention period of "5 days" indicates that upon snapshot creation, the snapshot will be locked and retained for a duration of 5 days. In one embodiment, the locking and retention of a snapshot on a particular volume is subject to the prerequisite that the particular volume has a "snapshot-locking-enabled" option or parameter (which may be part of the configuration information) set to true. In such an embodiment, if the particular volume does not have retention enabled, the retention period 723 setting will be ignored. In one embodiment, the retention period 723 may be defined in terms of years (e.g., 0 to 100), months (e.g., 0 to 1200), days (e.g., 0 to 36500), and/or hours (e.g., 0 to 24). In alternative embodiments, rather than assigning a retention time (or expiration time) to a snapshot indirectly based on an associated schedule policy by adding the retention period defined by the schedule policy to the current time, a retention time may be assigned directly to a given snapshot by an administrative user via a UI (e.g., UI 611*a*) or a CLI by selecting an unlocked snapshot and providing a date/time in the future (e.g., in the form MM/DD/YYY HH:MM:SS) assuming the snapshot locking is enabled for the volume on which the given snapshot is stored. In one embodiment, once retention is enabled for a particular volume it will not be allowed to be disabled as long as there are snapshots stored on the particular volume that are in the locked state.

In the context of the present example, snapshot backup policies may be established by defining a rule for at least one of the labels (in this case, hourly, daily, weekly, and monthly) of schedule policies applied to the volume at issue. In one embodiment, no more than one rule may be defined for each label. For example, snapshot backup policy 730*a* includes a rule 721*a* associated with the label "Hourly" defining the conditions for creation of hourly snapshots. In this example, hourly snapshots will be created for volume $V_1$ and stored on volume $V_1$ every two hours between 8 AM and 5 PM. It is to be appreciated the conditions may be specified differently. For example, more of fewer hours between snapshot creation, a longer or shorter time range, and/or inclusion of a limitation to certain days of the week.

Rules 721*b-d* define conditions for creation of other types of snapshots (e.g., daily snapshots, weekly snapshots, and monthly snapshots) of volume $V_1$. For example, rule 721*b* associated with the label "Daily" defines the conditions for creation of daily snapshots. Similarly, rule 721*c* associated with the label "Weekly" defines the conditions for creation of weekly snapshots, and rule 721*d* associated with the label "Monthly" defines the conditions for creation of monthly snapshots. Snapshot backup policy 730*a* is an example of a tiered backup policy that creates multiple types of snapshots each responsive to their respective conditions being satisfied. For purposes of comparison, snapshot backup policy 730*b* creates monthly snapshots for volume $V_n$ on the last day of each month at a specified time (e.g., 5:00 PM) in accordance with rule 721*e*. This flexible, policy-based approach for triggering creation of snapshots allows an administrative user to define appropriate snapshot backup policies suitable for meeting their RPO needs.

While in the context of the present example, hourly snapshots are configured to be retained for 1 day, daily snapshots are configured to be retained for 1 week, weekly snapshots are configured to be retained for 1 year, and monthly snapshots are configured to be retained for 1 year, it is to be appreciated such retention periods are merely exemplary and may be longer or shorter as desired.

Example Destination Cluster Configuration Information

Figure 8:
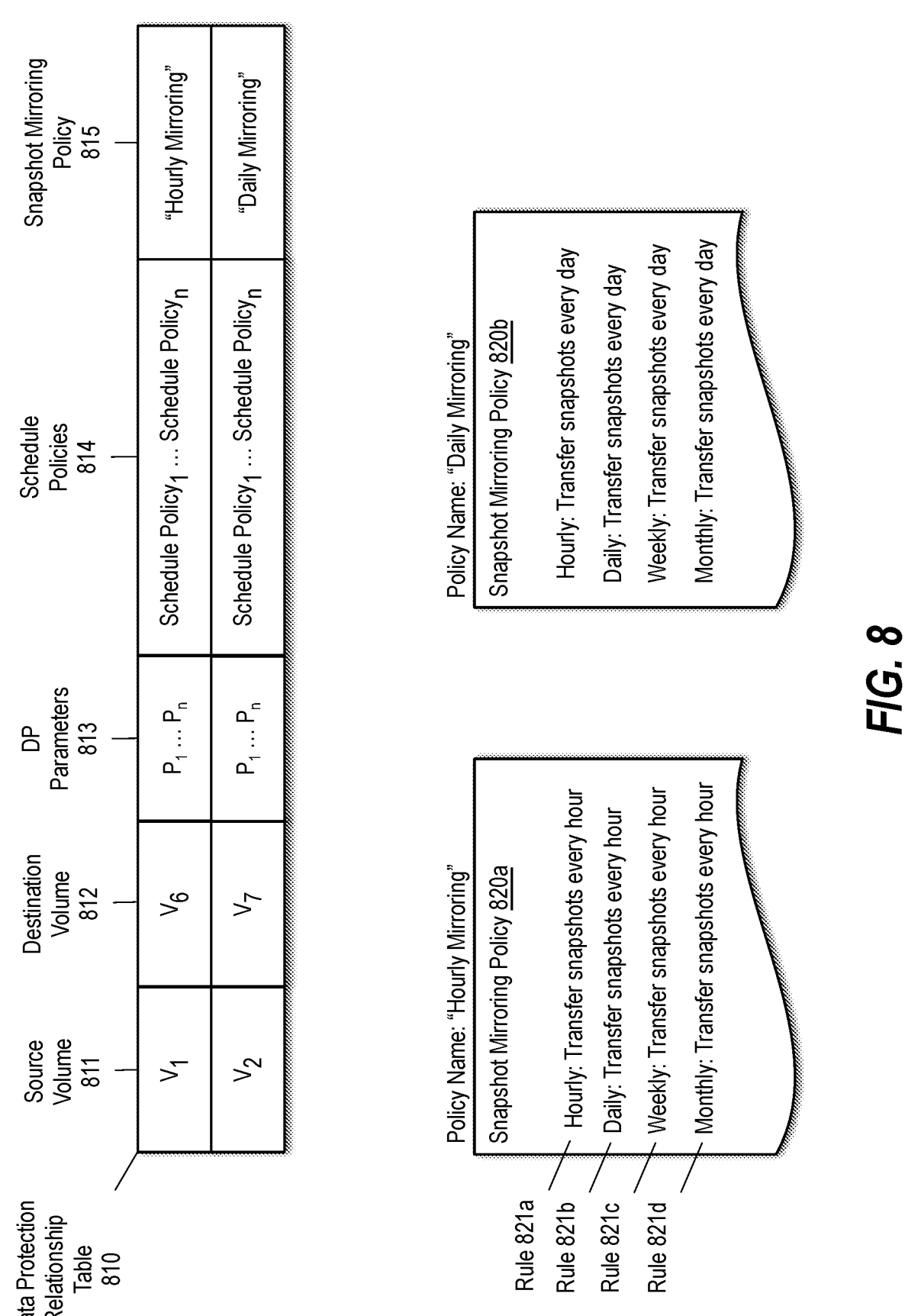
FIG. 8 is a block diagram conceptually illustrating examples of a data protection relationship table and snapshot mirroring policies in accordance with an embodiment of the present disclosure.

FIG. 8 is a block diagram conceptually illustrating examples of a data protection relationship table (e.g., data protection relationship table 810) and snapshot mirroring policies (e.g., snapshot mirroring policies 820*a* and 820*b*) in accordance with an embodiment of the present disclosure. The data protection relationship table and the snapshot mirroring policies represent non-limiting examples of configuration information (which may be analogous to config table 235) that may be maintained (e.g., within the replicated configuration database) and utilized by a destination cluster (e.g., destination cluster 600b) in connection with supporting performance of snapshot mirroring functionality.

In the context of the present example, the data protection relationship table 810 may include an entry for each source volume/destination volume pair for which a data protection relationship has been established. Each entry includes a source volume 811, a destination volume 812, data protection parameters 813, one or more schedule policies 814 (which may be analogous to schedule policies 720a-d), and a snapshot mirroring policy 815.

In order to establish an air gap between snapshots on the source volume and the snapshot replicas transferred to the destination volume, the source volume and the destination volume involved in the data protection relationship should be associated with different clusters (e.g., distributed storage systems on different virtual local area networks (VLANs), distributed storage systems in different datacenters, or distributed storage systems in which one is on-prem and the other is cloud-based). In this case, a first data protection relationship (e.g., a mirroring relationship) has been established between volumes $V_1$ (e.g., of source cluster 600a) and $V_6$ (e.g., of destination cluster 600b) and a second data protection relationship has been established between volumes $V_2$ (e.g., of source cluster 600a) and $V_7$ (e.g., of destination cluster 600b).

Non-limiting examples of snapshot mirroring policies include snapshot mirroring policy 820a and 820b. Snapshot mirroring policy 820a includes four rules (rules 821a-d) defining a schedule according to which various types of snapshots (e.g., hourly snapshots, daily snapshots, weekly snapshots, and monthly snapshots) are to be transferred from the source volume involved in the data protection relationship to the destination volume involved in the data protection relationship. In the context of the present example, snapshot mirroring policy 820a triggers hourly mirroring of snapshots created on the source volume since the last mirroring cycle to the destination volume and snapshot mirroring policy 820b triggers such mirroring on a daily basis. As above, it is to be noted the conditions specified by the example rules are merely exemplary and may be represent longer or shorter intervals. Additionally, the rules defined for each label are independent and may represent different intervals.

Example Approach for Facilitating Recovery from a Ransomware Attack

Figure 9:
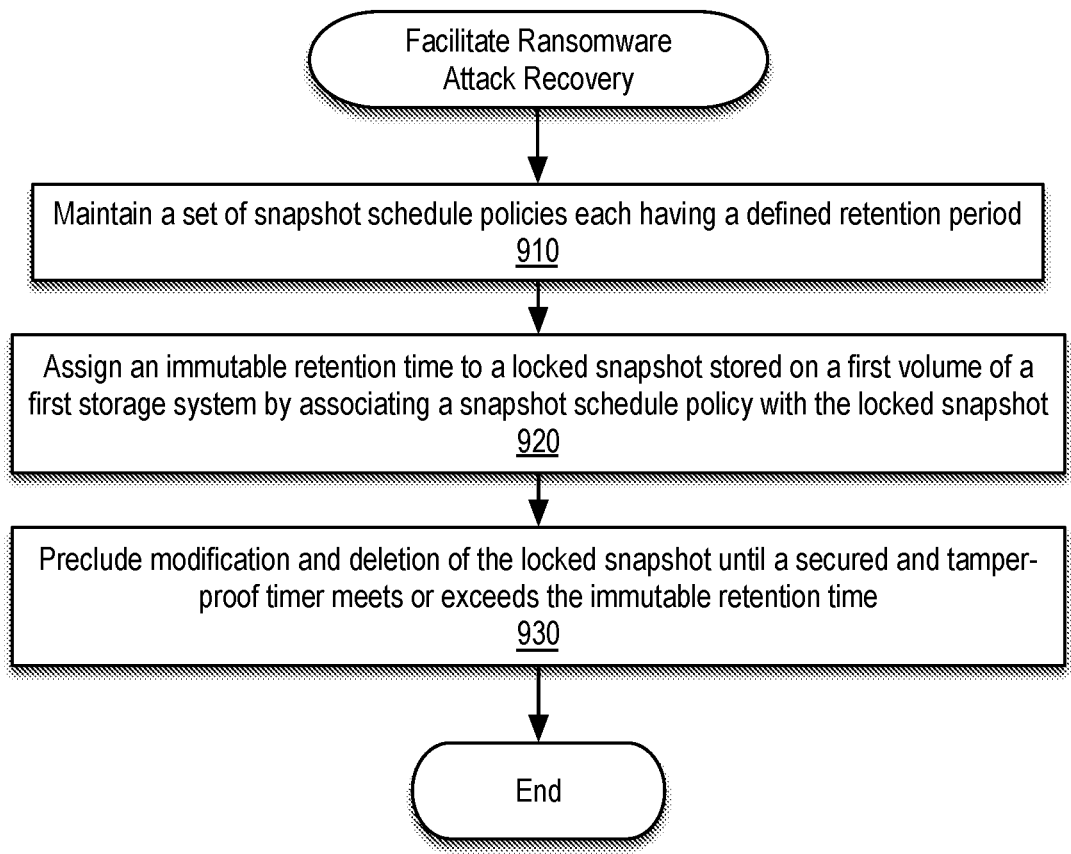
FIG. 9 is a high-level flow diagram illustrating a set of operations for facilitating ransomware attack recovery in accordance with an embodiment of the present disclosure.

FIG. 9 is a high-level flow diagram illustrating a set of operations for facilitating ransomware attack recovery in accordance with an embodiment of the present disclosure. The processing described with reference to FIG. 9 may be performed by a cluster (e.g., source cluster 600a) of nodes representing a distributed storage system.

At block 910, a set of one or more snapshot schedule policies are maintained, each having a defined retention period. The snapshot schedule policies may represent default snapshot schedule policies provided by a storage operating system (e.g., storage operating system 300) and selected for use by an administrative user of the distributed storage system, variations on such default snapshot schedule policies made by the administrative user, or snapshot schedule policies created from scratch by the administrative user. Non-limiting examples of snapshot schedule policies for the creation of hourly, daily, weekly, and monthly snapshots were described above with reference to FIG. 7. The snapshot schedule policies may be managed (e.g., created, added, modified, deleted, and/or associated with a given volume) via interactions with a UI (e.g., UI 611a) and via use of a configuration module (e.g., configuration module 613a).

At block 920, an immutable retention time is assigned to a snapshot to lock the snapshot until the current time (e.g., as indicated by a secured and tamper-proof timer, for example, tamper-proof timer 624a) is greater than or equal to the retention time. The snapshot may be stored on a volume of a first storage system (e.g., source node 620a). The immutable retention time may be assigned to the snapshot manually via the UI or a CLI or automatically based on the retention time specified by a snapshot schedule policy with which the snapshot is associated. For example, the retention time assigned to a snapshot created as a result of schedule policy 720a, having a retention period of 1 day may be determined by adding 1 day to the current time. Once a retention time has been assigned to a snapshot any further attempts at changing the retention time or the snapshot schedule policy associated with the snapshot may be disregarded. In one embodiment, the retention time assigned to a given snapshot is made immutable as a result of storing the retention time in a lock metafile that is itself stored within a private inode space (e.g., hidden meta-data root directory 530), thereby making the lock metafile and the retention time contained therein inaccessible except by a snapshot deletion workflow. Further description regarding how a snapshot may be automatically locked at the time of snapshot creation is provided below with reference to FIG. 11.

At block 930, any attempted modification or deletion of the locked snapshot may be precluded until the secured and tamper-proof timer meets or exceeds the immutable retention time. In one embodiment, an exception to precluded modifications may be a snapshot rename. Locking of a snapshot to provide protection against a ransomware attack need not impose any restrictions on snapshot names. As such, depending on the particular implementation, the renaming a snapshot may be allowed.

Notably, in order to address a potential workaround to the inability to delete locked snapshots involving simply deleting the volume on which the locked snapshots are stored, all volumes for which the snapshot retention feature is enabled may be assigned an expiry period. For example, when a volume stores locked snapshots, the expiry period for the volume may be set based on the largest retention time among all of the snapshots. In one embodiment, an unexpired volume will be prevented from deletion, thereby preserving the volume until all locked snapshots stored thereon have expired.

Example Policy-Based Snapshot Creation

Figure 10:
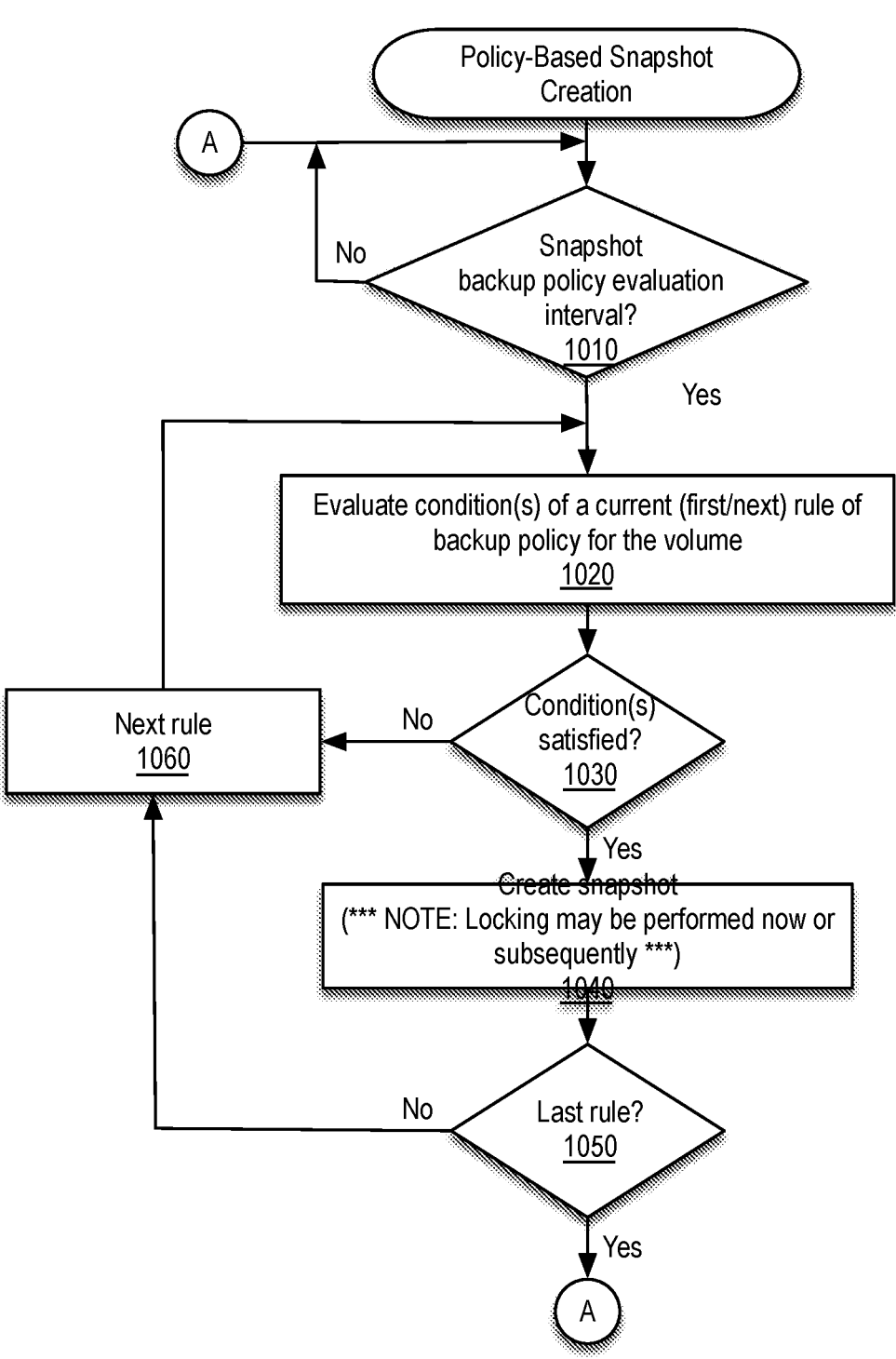
FIG. 10 is a flow diagram illustrating a set of operations for policy-based snapshot creation in accordance with an embodiment of the present disclosure.

FIG. 10 is a flow diagram illustrating a set of operations for policy-based snapshot creation in accordance with an embodiment of the present disclosure. The processing described with reference to FIG. 10 may be performed by a cluster (e.g., source cluster 600a) of nodes representing a distributed storage system.

At decision block 1010, it is determined whether a snapshot backup policy evaluation interval has expired for a particular volume. If so, processing continues with block 1020; otherwise, processing loops back to decision block 1010. The snapshot backup policy evaluation interval may be set so as to accommodate the highest evaluation frequency (e.g., evaluation frequency 722) of all snapshot schedule policies (e.g., schedule policies 720a-d) associated with a rule (e.g., rules 721a-d) of the snapshot backup policy (e.g., snapshot backup policy 730*a* or 730*b*) assigned to the particular volume. For example, assuming the existence of multiple snapshot schedule policies (e.g., that are part of a tiered backup policy) having evaluation frequencies ranging between 1 hour and 1 day, the snapshot backup policy evaluation interval should be set to 1 hour or less.

At block 1020, the condition(s) of a current rule (e.g., the first rule or a subsequent rule, as the case may be) of the snapshot backup policy assigned to the particular volume are evaluated.

At decision block 1030, it is determined whether all condition(s) are satisfied. If so, processing continues with block 1040; otherwise, processing branches to block 1060.

At block 1040, a snapshot of the particular volume is created. Depending upon the particular implementation, the creation of the snapshot may involve briefly pausing the processing of input/output (I/O) operations or fencing I/O operations associated with the particular volume while the snapshot is being created and then resuming such I/O processing. As part of block 1040 or immediately following block 1040, the newly created snapshot may be locked if appropriate. A non-limiting example of performing snapshot locking at the time of snapshot creation is described below with reference to FIG. 11.

At decision block 1050, a determination is made regarding whether the current rule represents the last rule (e.g., rule 721*d*) of the snapshot backup policy. If so, all snapshot creation activity for the current interval and for the particular volume is complete and processing loops back to decision block 1010; otherwise, processing continues with block 1060.

At block 1060, processing moves on to the next rule of the snapshot backup policy. For example, assuming this is the first rule evaluation iteration, a first rule (e.g., rule 721*a*) of the snapshot backup policy would have been evaluated at block 1020; and in preparation for the second rule evaluation iteration, the next rule (e.g., rule 721*b*) is retrieved from the snapshot backup policy. In this manner, each rule of the snapshot backup policy is evaluated during a given snapshot backup policy evaluation interval and each type of snapshot (e.g., hourly, daily, weekly, and monthly) or a subset thereof for the particular volume may be created depending upon whether their respective conditions are satisfied.

While in the context of the present example, for simplicity policy-based snapshot creation is described for a single volume, it is to be appreciated the cluster may loop through all volumes associated with the cluster to create snapshots based on their respective snapshot backup policies.

Example Automatic Snapshot Locking Upon Creation

Figure 11:
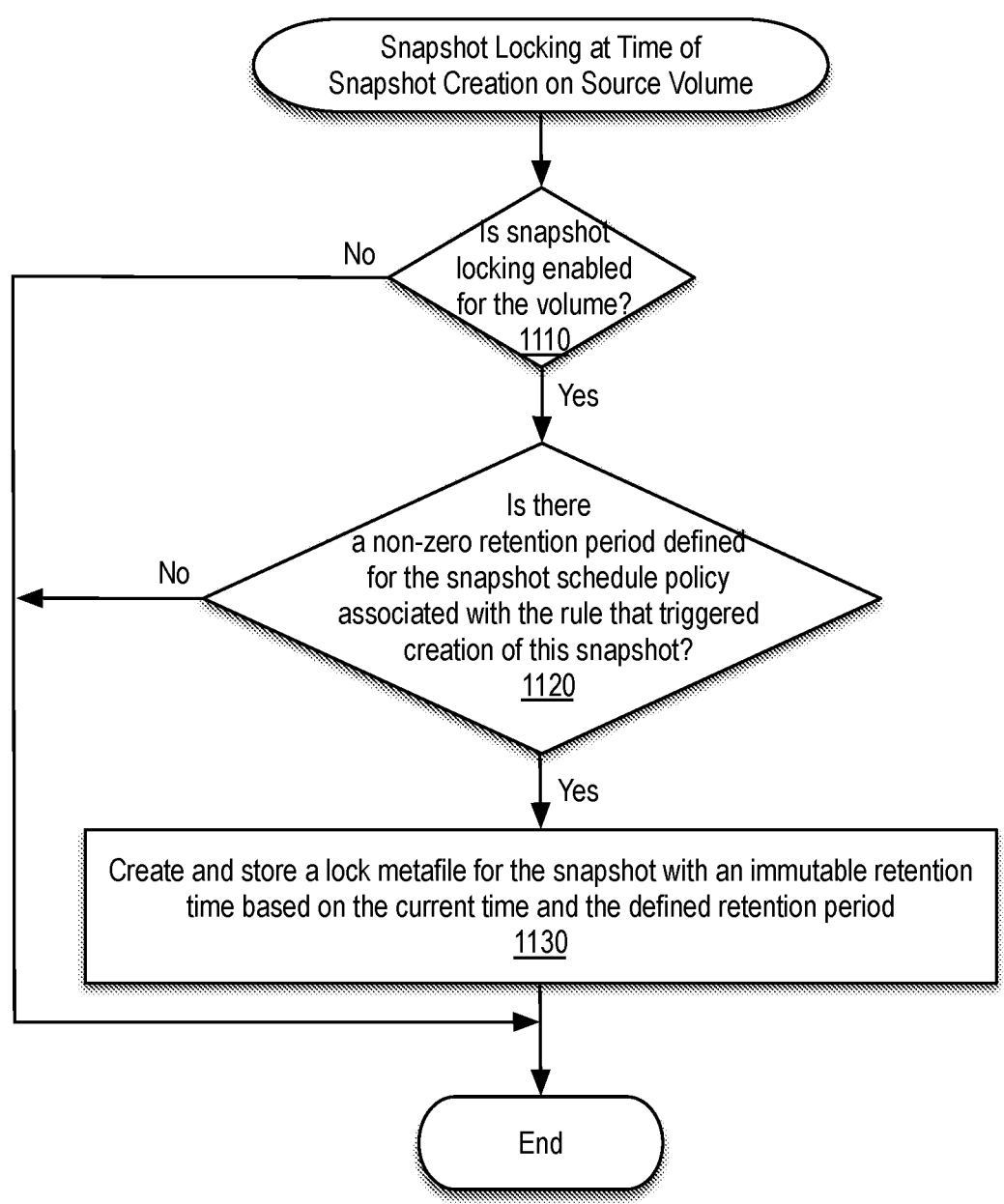
FIG. 11 is a flow diagram illustrating a set of operations for performing snapshot locking at the time of creation of a snapshot on a source volume in accordance with an embodiment of the present disclosure.

FIG. 11 is a flow diagram illustrating a set of operations for performing snapshot locking at the time of creation of a snapshot on a source volume in accordance with an embodiment of the present disclosure. The processing described with reference to FIG. 11 may be performed by a cluster (e.g., source cluster 600*a*) of nodes representing a distributed storage system and may be performed immediately after the creation of a given snapshot, for example, as part of block 1040 or immediately following block 1040.

At decision block 1110, it is determined whether snapshot locking is enabled for the volume on which the snapshot is stored. If so, processing continues to decision block 1120; otherwise, snapshot locking processing is complete and the snapshot at issue is not locked. In one embodiment, a snapshot-locking-enabled flag is part of the configuration information stored in the replicated database for each volume.

At decision block 1120, it is determined whether a non-zero retention period is defined for the snapshot schedule policy (e.g., one of schedule policies 720*a-d*) associated with the rule (e.g., one of rules 721*a-e*) that triggered creation of the snapshot at issue (e.g., one of snapshots 625*a-n*). If so, processing continues with block 1130; otherwise, snapshot locking processing is complete and the snapshot at issue is not locked.

At block 1130, a lock metafile (e.g., one of lock metafiles 626*a-n*) is created and stored for the snapshot at issue. During creation of the lock metafile an association may be formed between the snapshot at issue and the lock metafile. For example, a snapshot ID corresponding to the snapshot ID of the snapshot at issue may be added to the lock metafile. Additionally, the lock metafile may be tagged with an immutable retention time tag, for example, by setting a retention time field/attribute of the lock metafile. The retention time may be set by retrieving a current time as indicated by a local tamper-proof timer (e.g., tamper-proof timer 624*a*) and adding the retention period (e.g., 1 day, 1 week, 1 year, etc.) specified by the associated snapshot schedule policy. To prevent modification or deletion of the lock metafile and thereby enforcing the immutability of the retention time and the immutability of the snapshot at issue (until expiration of the retention period), the lock metafile may be stored in a private inode space (e.g., hidden metadata root directory 530) to which only a limited number of system workflows (e.g., the snapshot deletion/retention workflow described with reference to FIG. 14) may have access.

In the context of the present example, a given snapshot associated with a non-zero retention period at the time of its creation may be immediately locked. It is to be noted there may be other types of snapshots (e.g., application requested snapshots) that at the time of creation do not have an associated retention period. These other types of snapshots may be manually assigned a retention time minute, hours, or days after their creation and may be locked on the source volume (as appropriate) responsive to the retention time being assigned to them.

Example Snapshot Mirroring

FIG. 12 is a flow diagram illustrating a set of operations for policy-based snapshot mirroring in accordance with an embodiment of the present disclosure. As noted above, in one embodiment, the transfer of snapshots from a source volume to a destination volume involved in a data protection relationship may be destination managed. As such, the processing described with reference to FIG. 12 may be performed by a cluster (e.g., destination cluster 600*b*) of nodes representing a distributed storage system.

At decision block 1210, it is determined whether a snapshot mirroring policy evaluation interval has expired. If so, processing continues with block 1220; otherwise, processing loops back to decision block 1210. According to one embodiment, the snapshot mirroring policy evaluation interval is defined by an administrative user and may be associated with a data protection relationship (e.g., one of the rows of data protection relationship table 810) between a given source/destination volume pair.

At block 1220, the condition(s) of a current rule (e.g., the first rule or a subsequent rule, as the case may be) of the snapshot mirroring policy (e.g., one of snapshot mirroring policies 820*a-b*) assigned to a current data protection relationship (e.g., one of the rows of data protection relationship table 810) between a particular destination volume and a particular source volume are evaluated.

At decision block 1230, it is determined whether all condition(s) are satisfied. If so, processing continues with block 1250; otherwise, processing branches to block 1240.

At block 1240, processing moves on to the next rule of the snapshot mirroring policy. For example, assuming this is the first rule evaluation iteration, a first rule (e.g., rule 821*a*) of the snapshot mirroring policy would have been evaluated at block 1220; and in preparation for the second rule evaluation iteration, the next rule (e.g., rule 821*b*) is retrieved from the snapshot mirroring policy. In this manner, each rule of the snapshot mirroring policy is evaluated during a given snapshot mirroring policy evaluation interval and initiation of transfer of each type of snapshot (e.g., hourly, daily, weekly, and monthly) or a subset thereof may be triggered depending upon whether their respective conditions are satisfied.

At block 1250, those snapshots, if any, on the corresponding source volume that were created on the particular source volume and having a snaplabel matching that of the current rule (e.g., one of rules 812*a-d*) since the last mirroring interval are caused to be transferred to the particular destination volume. In one embodiment, this involves a control plane (e.g., control plane 621*b*) of a destination node (e.g., destination node 620*b*) associated with the particular destination volume communicating information regarding the desired transfer to a corresponding control plane (e.g., control plane 621*a*) of a source node (e.g., source node 620*a*) associated with the particular source volume. The control plane for its part may delegate the snapshot transfer to a data plane (e.g., data plane 623*a*) of the source node and the two control planes may thereafter monitor the progress of the snapshot transfer. In one embodiment, the transfer of a given snapshot (e.g., snapshot 625*a*) from the particular source volume to the particular destination volume also includes concurrently sending the retention time associated with the given snapshot to facilitate locking of the replica of the given snapshot on the destination volume. When the given snapshot is stored in locked form on the source volume, the retention time may be read from the lock metafile (e.g., lock metafile 626*a*). When the given snapshot is stored in unlocked form on the source node, the retention time may be calculated based on the current time as indicated by a local tamper-proof timer (e.g., tamper-proof timer 624*a*) and a retention period (e.g., retention period 723) associated with the given snapshot. For example, a retention period (e.g., 1 day, 1 week, 1 year, etc.) specified by an associated snapshot schedule policy (e.g., schedule policy 720*a*) may be added to the current time as indicated by the tamper-proof timer. If the given snapshot does not have an associated retention period, a retention time of zero may be sent to the particular destination volume. A non-limiting example of performing snapshot locking at the time of receipt of a snapshot replica at the destination node is described below with reference to FIG. 13.

At decision block 1260, a determination is made regarding whether the current rule represents the last rule (e.g., rule 821*d*) of the snapshot mirroring policy. If so, all snapshot mirroring activity for the current data protection relationship is complete and processing continues with decision block 1270; otherwise, processing branches to block 1240.

At decision block 1270, a determination is made regarding whether the current data protection relationship is the last in which the particular destination volume is involved. If so, all snapshot mirroring activity for the current interval and for the particular destination volume is complete and processing loops back to decision block 1210; otherwise, processing continues with block 1280.

While in the context of the present example, a flexible scheduling approach is described for initiating the transfer of snapshots of different types from a particular source volume to a particular destination volume based on a snapshot mirroring policy that may be associated with a data protection relationship involving the particular source volume and the particular destination volume, it is to be appreciated a single scheduling thread (e.g., scheduler 612) executing on the destination cluster or a destination node (e.g., destination node 620*b*) may be used to trigger the transfer of all snapshots created on the source volumes to their respective destination volumes.

Similarly, while in the context of the present example, the transfer of snapshots is decoupled from the creation of snapshots, in an alternative embodiment, snapshot creation may trigger an immediate transfer of the snapshot or the scheduling of a job to do so.

Additionally, although in the context of the present example, a simplified policy-based snapshot mirroring approach is described from the perspective of a single destination volume, it is to be appreciated the during a given snapshot mirroring policy evaluation interval the destination cluster or destination node may loop through all associated volumes representing destination volumes in a data protection relationship.

Example Automatic Snapshot Locking Upon Transfer

Figure 13:
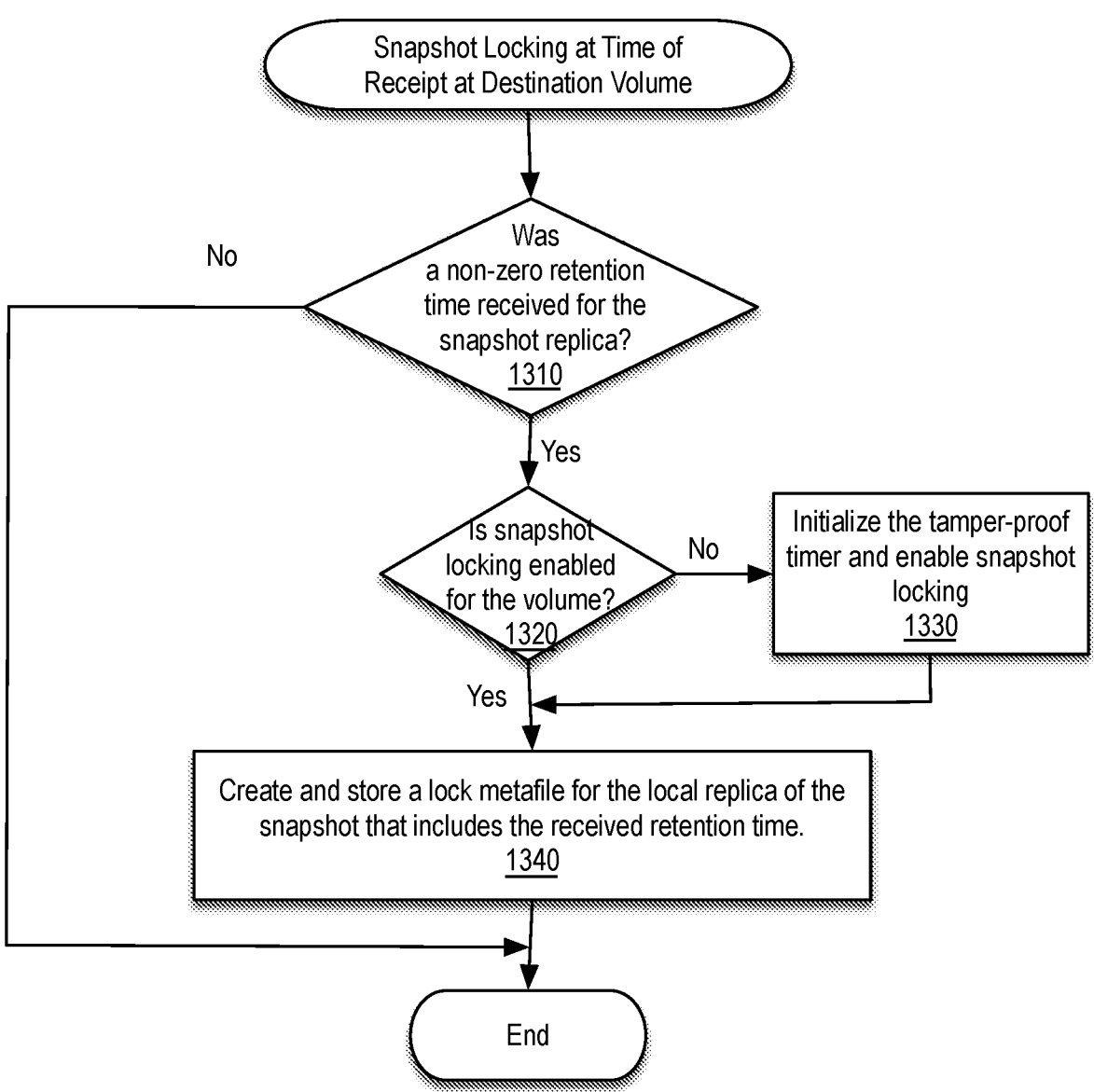
FIG. 13 is a flow diagram illustrating a set of operations for performing snapshot locking at the time of receipt of a snapshot replica at a destination volume in accordance with an embodiment of the present disclosure.

FIG. 13 is a flow diagram illustrating a set of operations for performing snapshot locking at the time of receipt of a snapshot replica (e.g., one of snapshot replicas 627*a-n*) at a destination volume in accordance with an embodiment of the present disclosure. The processing described with reference to FIG. 13 may be performed by a cluster (e.g., destination cluster 600*b*) of nodes representing a distributed storage system and may be performed immediately after the transfer of a given snapshot (e.g., one of snapshots 625*a-n*) to the destination volume has been completed, for example, responsive to receipt of the given snapshot responsive to block 1250.

At decision block 1310, it is determined whether a non-zero retention time was received for the snapshot replica (e.g., snapshot replica 627*a*) of the original snapshot (e.g., snapshot 625*a*) stored on the source volume (e.g., a volume associated with the source node (e.g., source node 620*a*)). If so, processing continues with decision block 1320; otherwise, snapshot locking processing is complete and the local snapshot replica at issue is not locked.

At decision block 1320, it is determined whether snapshot locking is enabled for the destination volume. If so, processing continues to block 1340; otherwise, processing branches to block 1330. As noted above, in one embodiment, a snapshot-locking-enabled flag may be part of the configuration information stored in the replicated database for each volume. In such an embodiment, the determination regarding whether snapshot locking is enabled involves retrieving and evaluating the snapshot-locking-enabled flag for the destination volume.

At block 1330, the local tamper-proof timer (e.g., tamper-proof timer 624*b*) is initialized and the snapshot-locking-enabled flag is set.

At block 1340, a lock metafile (e.g., one of lock metafiles 628*a-n*) is created and stored for the snapshot replica at issue. During creation of the lock metafile an association may be formed between the snapshot replica at issue and the lock metafile. For example, a snapshot ID corresponding to the snapshot ID of the snapshot replica at issue may be added to the lock metafile. Additionally, the lock metafile may be tagged with an immutable retention time tag, for example, by setting a retention time field/attribute of the lock metafile. In one embodiment, the retention time is set based on the retention time received concurrently with the snapshot replica. As above, to prevent modification or deletion of the lock metafile and thereby enforcing the immutability of the retention time and the immutability of the snapshot replica at issue (until expiration of the retention period), the lock metafile may be stored in a private inode space (e.g., hidden meta-data root directory 530) to which only a limited number of system workflows (e.g., the snapshot deletion/retention workflow described with reference to FIG. 14) may have access.

In this manner, each of the use cases for retention of snapshots in locked form on the destination volume are supported, including (i) receipt of a replica of a snapshot from a source volume that was stored in locked form on the source volume and also maintaining the replica of the locked snapshot on the destination volume for at least the associated immutable retention time; and (ii) receipt of a replica of a snapshot from a source volume that was stored in unlocked form on the source volume (but that is associated with a retention period), locking the replica of the unlocked snapshot on the destination volume based on a retention time provided by the source volume, and maintaining the locked snapshot replica for at least the associated immutable retention time.

Example Snapshot Deletion/Retention

Figure 14:
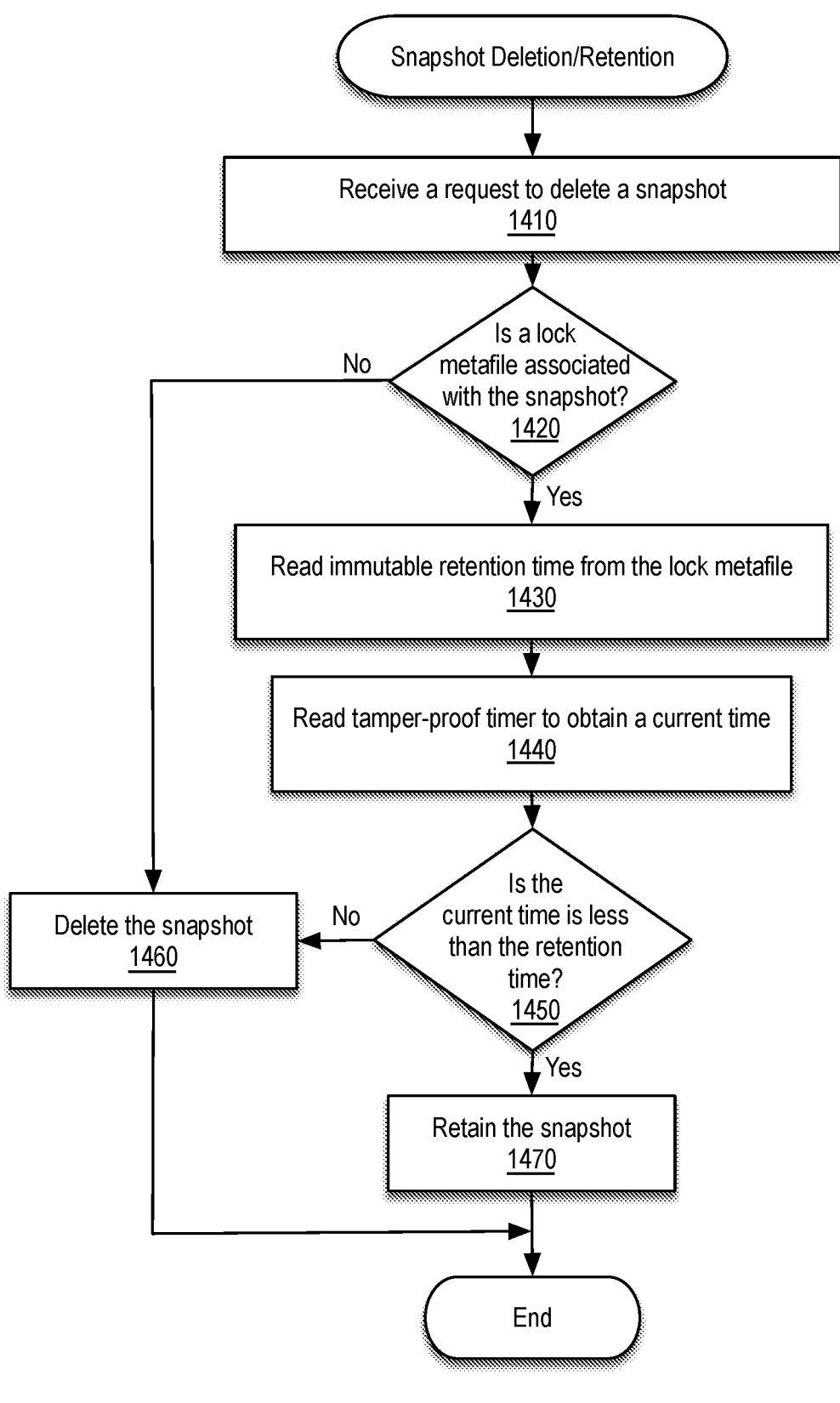
FIG. 14 is a flow diagram illustrating a set of operations for performing snapshot deletion or retention, as the case may be, in accordance with an embodiment of the present disclosure.

FIG. 14 is a flow diagram illustrating a set of operations for performing snapshot deletion or retention, as the case may be, in accordance with an embodiment of the present disclosure. The processing described with reference to FIG. 14 may be performed by a cluster (e.g., source cluster 600*a* or destination cluster 600*b*) of nodes representing a distributed storage system. In the context of the present example, in order to prevent, among other things, the accidental deletion of a snapshot prior to expiry of an associated retention time or a potential malicious deletion of the snapshot, for example, as part of a ransomware attack prior to expiry of the associated retention time, a lock metafile, if any, associated with the snapshot is consulted.

At block 1410, a request to delete a snapshot (or a snapshot replica) is received.

At decision block 1420, it is determined whether a lock metafile is associated with the snapshot. If so, then processing continues with block 1430; otherwise, processing branches to block 1460. In one embodiment, a lock metafile includes the snapshot ID of the corresponding snapshot. As such, the determination may involve evaluating whether any of the lock metafiles stored on the volume at issue include a snapshot ID matching that of the snapshot at issue.

At block 1430, the immutable retention time is read from the associated lock metafile.

At block 1440, a current time is obtained by reading the local tamper-proof timer (e.g., tamper-proof timer 624*a* or 624*b*).

At decision block 1450, it is determined whether the current time is less than the retention time. If so, processing continues with block 1470; otherwise, processing branches to block 1460.

At block 1460, there is either no lock metafile associated with the snapshot (i.e., the snapshot is unlocked) or the current time is greater than or equal to the retention time of the associated lock metafile (i.e., there is no requirement to continue to retain the snapshot). In either case, the snapshot may properly be deleted.

At block 1470, the snapshot is retained as the retention time has not yet expired.

While in the context of the examples described with reference to the flow diagrams of FIGS. 9-14, a number of enumerated blocks are included, it is to be understood that examples may include additional blocks before, after, and/or in between the enumerated blocks. Similarly, in some examples, one or more of the enumerated blocks may be omitted and/or performed in a different order.

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks. Volatile media includes dynamic memory, such as a main memory of a computer system. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
receiving a replica of a snapshot of a source volume of a first storage system by a second storage system, wherein the replica is to be retained in locked form on a destination volume of the second storage system and wherein the snapshot is stored in unlocked form on the source volume;
locking the replica on the destination volume by assigning an immutable retention time to the replica based on a retention time associated with the snapshot; and
precluding deletion of the locked replica until a tamper-proof timer meets or exceeds the immutable retention time.

2. The method of claim 1, wherein the replica is received by the second storage system responsive to a request by the second storage system.

3. The method of claim 2, further comprising:
maintaining a data protection relationship between with the source volume and the destination volume; and
assigning a snapshot mirroring schedule to the data protection relationship, wherein the snapshot mirroring schedule specifies a frequency at which snapshots stored on the source volume are to be mirrored to the destination volume.

4. The method of claim 3, wherein the request is sent by the second storage system to the first storage system in accordance with the snapshot mirroring schedule.

5. The method of claim 1, wherein the first storage system is part of a first cluster of storage systems representing a first distributed storage system and the second storage system is part of a second cluster of storage systems representing a second distributed storage system.

6. The method of claim 1, wherein the immutable retention time is stored in a private metafile corresponding to the locked replica that is inaccessible to end users of the second storage system.

7. The method of claim 6, further comprising:
responsive to receipt of a request to delete the locked replica, determining whether deletion of the locked replica is permissible by accessing the private metafile;
after a negative determination indicating deletion of the locked replica is not permissible, retaining the locked replica; and
after an affirmative determination indicating deletion of the locked replica is permissible, deleting the locked replica.

8. The method of claim 1, wherein the tamper-proof timer is initialized with a time value upon creation, stored in memory, and updated independently of a system time of the second storage system.

9. The method of claim 6, wherein the private metafile is stored in a private index node (inode) space.

10. A system comprising:
one or more processing resources; and
instructions that when executed by the one or more processing resources cause the system to:
receive a replica of a snapshot of a source volume of a first storage system by a second storage system, wherein the replica is to be retained in locked form on a destination volume of the second storage system and wherein the snapshot is stored in unlocked form on the source volume;
lock the replica on the destination volume by assigning an immutable retention time to the replica based on a retention time associated with the snapshot; and
preclude deletion of the locked replica until a tamper-proof timer meets or exceeds the immutable retention time.

11. The system of claim 10, wherein the replica is received by the second storage system responsive to a request by the second storage system.

12. The system of claim 11, wherein the instructions further cause the system to:
maintain a data protection relationship between with the source volume and the destination volume; and
assign a snapshot mirroring schedule to the data protection relationship, wherein the snapshot mirroring schedule specifies a frequency at which snapshots stored on the source volume are to be mirrored to the destination volume.

13. The system of claim 12, wherein the request is sent by the second storage system to the first storage system in accordance with the snapshot mirroring schedule.

14. The system of claim 10, wherein the first storage system is part of a first cluster of storage systems representing a first distributed storage system and the second storage system is part of a second cluster of storage systems representing a second distributed storage system.

15. The system of claim 10, wherein the immutable retention time is stored in a private metafile corresponding to the locked replica that is inaccessible to end users of the second storage system.

16. The system of claim 13, wherein the instructions further cause the system to:
responsive to receipt of a request to delete the locked replica, determine whether deletion of the locked replica is permissible by accessing the private metafile;
after a negative determination indicating deletion of the locked replica is not permissible, retain the locked replica; and
after an affirmative determination indicating deletion of the locked replica is permissible, delete the locked replica.

17. The system of claim 10, wherein the tamper-proof timer is initialized with a time value upon creation, stored in memory, and updated independently of a system time of the second storage system.

18. The system of claim 15, wherein the private metafile is stored in a private index node (inode) space.

19. A non-transitory machine readable medium storing instructions, which when executed by one or more processing resources of a system including a first storage system and a second storage system, cause the system to:

receive a replica of a snapshot of a source volume of the first storage system by the second storage system, wherein the replica is to be retained in locked form on a destination volume of the second storage system and wherein the snapshot is stored in unlocked form on the source volume;

lock the replica on the destination volume by assigning an immutable retention time to the replica based on a retention time associated with the snapshot; and preclude deletion of the locked replica until a tamper-proof timer meets or exceeds the immutable retention time.

20. The non-transitory machine readable medium of claim 19, wherein the replica is received by the second storage system responsive to a request by the second storage system.

21. The non-transitory machine readable medium of claim 20, wherein the instructions further cause the system to:

maintain a data protection relationship between with the source volume and the destination volume; and assign a snapshot mirroring schedule to the data protection relationship, wherein the snapshot mirroring schedule specifies a frequency at which snapshots stored on the source volume are to be mirrored to the destination volume.

22. The non-transitory machine readable medium of claim 21, wherein the request is sent by the second storage system to the first storage system in accordance with the snapshot mirroring schedule.

23. The non-transitory machine readable medium of claim 19, wherein the immutable retention time is stored in a private metafile corresponding to the locked replica that is inaccessible to end users of the second storage system.

24. The non-transitory machine readable medium of claim 23, wherein the instructions further cause the system to:

responsive to receipt of a request to delete the locked replica, determine whether deletion of the locked replica is permissible by accessing the private metafile;

after a negative determination indicating deletion of the locked replica is not permissible, retain the locked replica; and after an affirmative determination indicating deletion of the locked replica is permissible, delete the locked replica.

25. The non-transitory machine readable medium of claim 19, wherein the tamper-proof timer is initialized with a time value upon creation, stored in memory, and updated independently of a system time of the second storage system.

26. The non-transitory machine readable medium of claim 23, wherein the private metafile is stored in a private index node (inode) space.

* * * * *